US012780717B2

(12) United States Patent
Dejneka

(10) Patent No.: US 12,780,717 B2
(45) Date of Patent: Nov. 3, 2026

(54) HIGH RARE EARTH CONTENT SODA LIME COMPATIBLE GLASS

(71) Applicant: CORNING INCORPORATED, Corning, NY (US)

(72) Inventor: Matthew John Dejneka, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 1202 days.

(21) Appl. No.: 17/599,245

(22) PCT Filed: Mar. 16, 2020

(86) PCT No.: PCT/US2020/022890

§ 371 (c)(1),
(2) Date: Sep. 28, 2021

(87) PCT Pub. No.: WO2020/205213

PCT Pub. Date: Oct. 8, 2020

(65) Prior Publication Data

US 2022/0153630 A1 May 19, 2022

Related U.S. Application Data

(60) Provisional application No. 62/827,501, filed on Apr. 1, 2019.

(51) Int. Cl.

*C03C 3/095* (2006.01)
*C03B 25/02* (2006.01)

(Continued)

(52) U.S. Cl.

CPC .............. *C03C 3/095* (2013.01); *C03B 25/02* (2013.01); *C03C 3/089* (2013.01); *C03C 3/091* (2013.01); *C03C 4/02* (2013.01); *C03C 4/12* (2013.01)

(58) Field of Classification Search

None

See application file for complete search history.

(56) References Cited

U.S. PATENT DOCUMENTS 4,376,829 A 3/1983 Daiku
5,039,631 A 8/1991 Krashkevich et al.

(Continued)

FOREIGN PATENT DOCUMENTS

EP 127821 A1 * 12/1984 ............... C03C 3/08
EP 0524510 A1 1/1993

(Continued)

OTHER PUBLICATIONS

Machine Translation of WO 2015118964 A1 (Year: 2015).*

(Continued)

*Primary Examiner* — Amber R Orlando
*Assistant Examiner* — Paul Alan Forsyth
(74) *Attorney, Agent, or Firm* — Kevin M. Able

(57) ABSTRACT

An example glass composition comprises rare earth content (e.g., rare earth oxides, elements, and/or ions) of from about 0.5 mol % to about 20 mol %. The glass composition may have a liquidus temperature that is within a specified range, a softening point that is within a specified range, a working point that is within a specified range, and/or a coefficient of thermal expansion (CTE) that is within a specified range.

19 Claims, 17 Drawing Sheets

(51) Int. Cl.

| | |
|---|---|
| ***C03C 3/089*** | (2006.01) |
| ***C03C 3/091*** | (2006.01) |
| ***C03C 4/02*** | (2006.01) |
| ***C03C 4/12*** | (2006.01) |

(56) References Cited

U.S. PATENT DOCUMENTS

| | | | | |
|---|---|---|---|---|
| 5,190,896 | A | 3/1993 | Pucilowski et al. | |
| 5,446,007 | A * | 8/1995 | Krashkevich | C03C 3/085 501/67 |
| 7,192,898 | B2 | 3/2007 | Mori et al. | |
| 2016/0264864 | A1 | 9/2016 | Dejneka et al. | |
| 2017/0129801 | A1 | 5/2017 | Kikkawa et al. | |
| 2018/0170796 | A1 | 6/2018 | Brocheton | |
| 2018/0215652 | A1* | 8/2018 | Sakagami | C03C 3/091 |
| 2019/0352217 | A1* | 11/2019 | Lautenschläger | C03C 4/0092 |
| 2019/0382303 | A1* | 12/2019 | Grimm | C03B 17/04 |

FOREIGN PATENT DOCUMENTS

| | | | | |
|---|---|---|---|---|
| WO | WO-2015118964 | A1 * | 8/2015 | C03C 3/095 |
| WO | WO-2017180811 | A1 * | 10/2017 | C03C 4/12 |

OTHER PUBLICATIONS

International Search Report and Written Opinion of the International Searching Authority; PCT/US2020/022890; dated Jul. 15, 2020; 9 pages; European Patent Office.

* cited by examiner

FIG. 3A
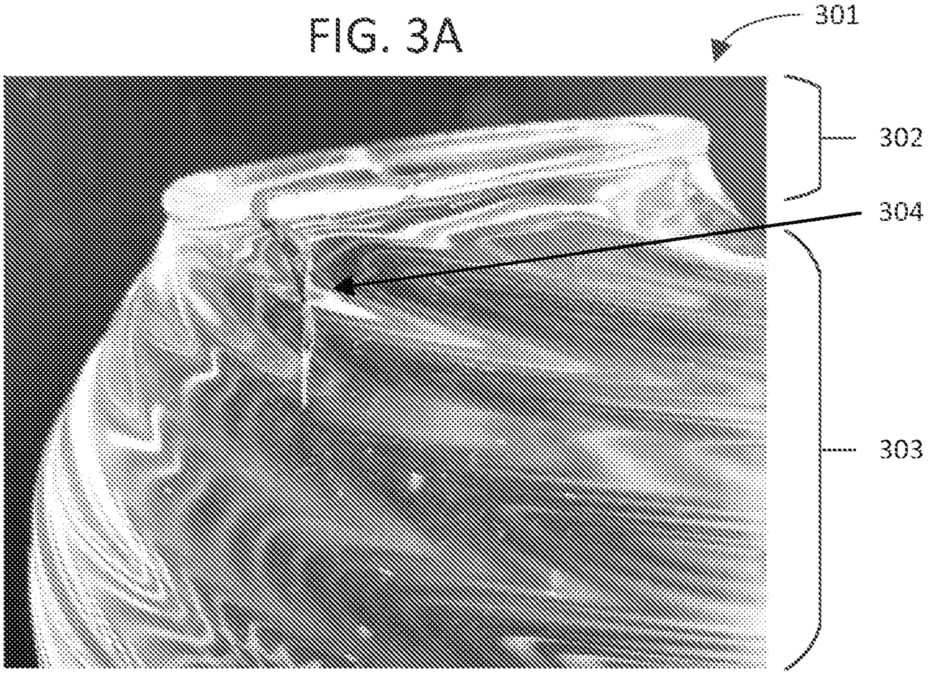
FIG. 3B
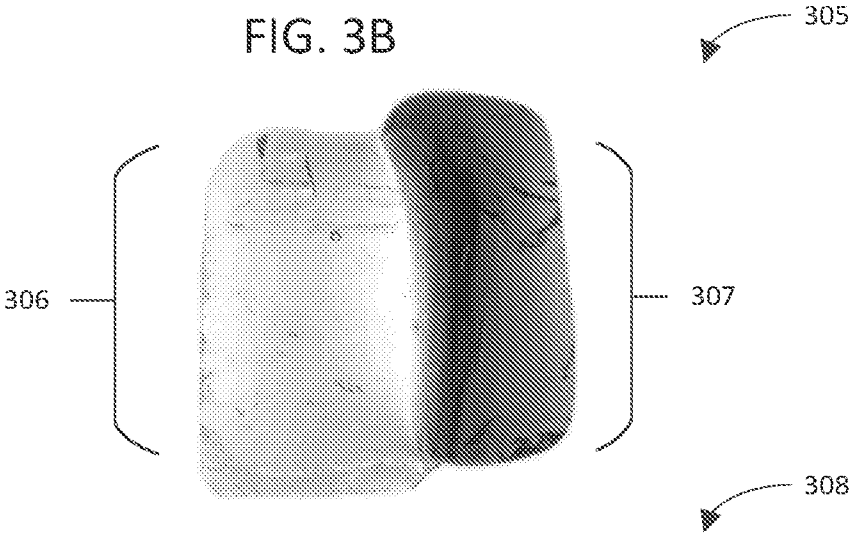
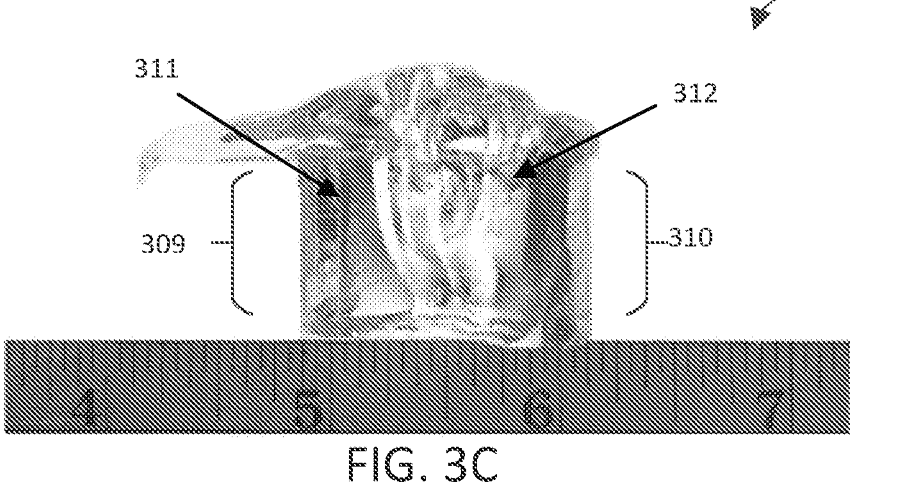
FIG. 3C

Sample Compositions of Soda Lime Glass Containing Rare Earth (mol%)

400

| | 175AQA | 175AQB | 175AQC | 175AQD | 175AQE | 175AQF | 175AQG | 175AQH | 175AQI |
|---|---|---|---|---|---|---|---|---|---|
| $SiO_2$ | 67.19 | 67.19 | 67.19 | 67.16 | 67.19 | 66.69 | 64.09 | 66.69 | 61.69 |
| $Al_2O_3$ | 1.03 | 1.03 | 1.03 | 1.03 | 1.03 | 1.02 | 0.98 | 1.02 | 0.95 |
| $B_2O_3$ | 1.48 | 1.48 | 1.48 | 1.47 | 1.48 | 1.46 | 1.41 | 1.46 | 1.35 |
| $Na_2O$ | 15.23 | 15.23 | 15.23 | 15.23 | 15.23 | 15.12 | 14.53 | 15.12 | 13.99 |
| $K_2O$ | 0.37 | 0.37 | 0.37 | 0.37 | 0.37 | 0.37 | 0.35 | 0.37 | 0.34 |
| MgO | 0.10 | 0.10 | 0.10 | 0.10 | 0.10 | 0.10 | 0.10 | 0.10 | 0.09 |
| CaO | 5.55 | 5.55 | 5.55 | 5.55 | 5.55 | 5.51 | 5.29 | 5.51 | 5.09 |
| BaO | 0.90 | 0.90 | 0.90 | 0.90 | 0.90 | 0.89 | 0.86 | 0.89 | 0.83 |
| ZnO | 0.73 | 0.73 | 0.73 | 0.73 | 0.73 | 0.73 | 0.70 | 0.73 | 0.67 |
| CuO | 0.00 | 0.00 | 0.00 | 0.00 | 0.00 | 0.74 | 1.06 | 0.74 | 1.36 |
| $Ce_2O_3$ | 0.00 | 0.00 | 0.00 | 0.05 | 0.00 | 0.00 | 0.00 | 0.00 | 0.00 |
| $Pr_2O_3$ | 0.00 | 0.00 | 0.00 | 0.00 | 0.00 | 0.00 | 0.00 | 2.58 | 4.77 |
| $Nd_2O_3$ | 0.00 | 0.00 | 0.00 | 0.00 | 0.00 | 0.00 | 0.00 | 4.79 | 8.86 |
| $Eu_2O_3$ | 0.09 | 0.46 | 0.93 | 0.46 | 0.46 | 0.00 | 0.00 | 0.00 | 0.00 |
| $Tb_2O_3$ | 7.33 | 6.96 | 6.49 | 6.95 | 6.96 | 0.00 | 0.00 | 0.00 | 0.00 |
| $Ho_2O_3$ | 0.00 | 0.00 | 0.00 | 0.00 | 0.00 | 7.37 | 10.62 | 0.00 | 0.00 |
| Total $RE_2O_3$ | 7.42 | 7.42 | 7.42 | 7.46 | 7.42 | 7.37 | 10.62 | 7.37 | 13.63 |
| Strain | 573°C | | | | 573°C | 579°C | | 540°C | |
| Anneal | 615°C | | | | 615°C | 621°C | | 581°C | |
| Appearance | G+fC | G+fC | G+fC | G+fC | G+fC | G+fC | C | G+fC | C |

G+fC = Glass with few crystals C = Totally devitrified

FIG. 4

FIG. 5-A1

Sample Glass Compositions (mol%)

| SAMPLE ID | $SiO_2$ | $Al_2O_3$ | $B_2O_3$ | $Li_2O$ | $Na_2O$ | $K_2O$ | MgO | CaO | SrO | BaO | ZnO | $SnO_2$ | $ZrO_2$ | $Fe_2O_3$ | CoO | CuO |
|---|---|---|---|---|---|---|---|---|---|---|---|---|---|---|---|---|
| 175AFM | 72.25 | 1.13 | 0.00 | 0.00 | 12.49 | 0.90 | 2.88 | 9.64 | 0.00 | 0.34 | 0.36 | 0.00 | 0.00 | 0.00 | 0.00 | 0.00 |
| 175AFN | 71.88 | 1.13 | 0.00 | 0.00 | 12.43 | 0.90 | 2.87 | 9.59 | 0.00 | 0.34 | 0.36 | 0.00 | 0.00 | 0.00 | 0.00 | 0.00 |
| 175AFO | 71.53 | 1.12 | 0.00 | 0.00 | 12.37 | 0.89 | 2.85 | 9.55 | 0.00 | 0.34 | 0.36 | 0.00 | 0.00 | 0.00 | 0.00 | 0.00 |
| 175AFP | 70.82 | 1.11 | 0.00 | 0.00 | 12.25 | 0.89 | 2.82 | 9.45 | 0.00 | 0.33 | 0.35 | 0.00 | 0.00 | 0.00 | 0.00 | 0.00 |
| 175AFQ | 70.22 | 1.95 | 0.00 | 0.00 | 12.14 | 0.88 | 2.80 | 9.37 | 0.00 | 0.33 | 0.35 | 0.00 | 0.00 | 0.00 | 0.00 | 0.00 |
| 175AFR | 68.88 | 3.83 | 0.00 | 0.00 | 11.91 | 0.86 | 2.75 | 9.19 | 0.00 | 0.33 | 0.34 | 0.00 | 0.00 | 0.00 | 0.00 | 0.00 |
| 175AFS | 70.82 | 1.11 | 0.00 | 0.00 | 12.25 | 0.89 | 2.82 | 9.45 | 0.00 | 0.33 | 0.35 | 0.00 | 0.00 | 0.00 | 0.00 | 0.00 |
| 175AFT | 70.75 | 1.11 | 0.00 | 0.00 | 12.23 | 0.88 | 2.82 | 9.44 | 0.00 | 0.33 | 0.35 | 0.00 | 0.00 | 0.10 | 0.00 | 0.00 |
| 175AFU | 70.69 | 1.11 | 0.00 | 0.00 | 12.22 | 0.88 | 2.82 | 9.43 | 0.00 | 0.33 | 0.35 | 0.00 | 0.00 | 0.20 | 0.00 | 0.00 |
| 175AFV | 69.29 | 1.09 | 0.00 | 0.00 | 14.15 | 0.87 | 2.76 | 9.25 | 0.00 | 0.33 | 0.35 | 0.00 | 0.00 | 0.00 | 0.00 | 0.00 |
| 175AFW | 68.11 | 1.07 | 0.00 | 0.00 | 15.61 | 0.85 | 2.71 | 9.09 | 0.00 | 0.32 | 0.34 | 0.00 | 0.00 | 0.00 | 0.00 | 0.00 |
| 175AFX | 69.42 | 1.09 | 0.00 | 0.00 | 12.05 | 0.87 | 4.70 | 9.27 | 0.00 | 0.33 | 0.35 | 0.00 | 0.00 | 0.00 | 0.00 | 0.00 |
| 175AFY | 68.11 | 1.07 | 0.00 | 0.00 | 11.82 | 0.85 | 6.50 | 9.09 | 0.00 | 0.32 | 0.34 | 0.00 | 0.00 | 0.00 | 0.00 | 0.00 |
| 175AFZ | 69.42 | 1.09 | 0.00 | 0.00 | 12.05 | 0.87 | 2.77 | 11.19 | 0.00 | 0.33 | 0.35 | 0.00 | 0.00 | 0.00 | 0.00 | 0.00 |
| 175AGA | 71.35 | 1.09 | 0.00 | 0.00 | 12.05 | 0.87 | 2.77 | 9.27 | 0.00 | 0.33 | 0.35 | 0.00 | 0.00 | 0.00 | 0.00 | 0.00 |
| 175AGB | 71.89 | 1.07 | 0.00 | 0.00 | 11.82 | 0.85 | 2.71 | 9.09 | 0.00 | 0.32 | 0.34 | 0.00 | 0.00 | 0.00 | 0.00 | 0.00 |
| 175AGC | 69.42 | 1.09 | 1.93 | 0.00 | 12.05 | 0.87 | 2.77 | 9.27 | 0.00 | 0.33 | 0.35 | 0.00 | 0.00 | 0.00 | 0.00 | 0.00 |
| 175AGD | 68.11 | 1.07 | 3.78 | 0.00 | 11.82 | 0.85 | 2.71 | 9.09 | 0.00 | 0.32 | 0.34 | 0.00 | 0.00 | 0.00 | 0.00 | 0.00 |
| 175ALW | 71.15 | 1.09 | 1.56 | 0.00 | 16.13 | 0.39 | 0.11 | 5.87 | 0.00 | 0.95 | 0.78 | 0.00 | 0.00 | 0.00 | 0.00 | 0.00 |
| 175ALX | 71.15 | 1.09 | 1.56 | 0.00 | 16.13 | 0.39 | 0.11 | 5.87 | 0.00 | 0.95 | 0.78 | 0.00 | 0.00 | 0.00 | 0.00 | 0.00 |
| 175ALY | 71.14 | 1.09 | 1.56 | 0.00 | 16.13 | 0.39 | 0.11 | 5.87 | 0.00 | 0.95 | 0.78 | 0.00 | 0.00 | 0.00 | 0.01 | 0.00 |
| 175ALZ | 71.05 | 1.09 | 1.56 | 0.00 | 16.11 | 0.39 | 0.11 | 5.87 | 0.00 | 0.95 | 0.78 | 0.00 | 0.00 | 0.14 | 0.00 | 0.00 |
| 175AMA | 71.15 | 1.09 | 1.56 | 0.00 | 16.13 | 0.39 | 0.11 | 5.87 | 0.00 | 0.95 | 0.78 | 0.00 | 0.00 | 0.00 | 0.00 | 0.00 |
| 175AMB | 71.15 | 1.09 | 1.56 | 0.00 | 16.13 | 0.39 | 0.11 | 5.87 | 0.00 | 0.95 | 0.78 | 0.00 | 0.00 | 0.00 | 0.00 | 0.00 |
| 175AMR | 71.15 | 1.09 | 1.56 | 0.00 | 16.13 | 0.39 | 0.11 | 5.87 | 0.00 | 0.95 | 0.78 | 0.00 | 0.00 | 0.00 | 0.00 | 0.00 |
| 175AMS | 71.15 | 1.09 | 1.56 | 0.00 | 16.13 | 0.39 | 0.11 | 5.87 | 0.00 | 0.95 | 0.78 | 0.00 | 0.00 | 0.00 | 0.00 | 0.00 |
| 175AMT | 71.50 | 1.10 | 1.57 | 0.00 | 16.21 | 0.39 | 0.11 | 5.90 | 0.00 | 0.96 | 0.78 | 0.00 | 0.00 | 0.00 | 0.00 | 0.00 |
| 175AMU | 71.15 | 1.09 | 1.56 | 0.00 | 16.13 | 0.39 | 0.11 | 5.87 | 0.00 | 0.95 | 0.78 | 0.49 | 0.00 | 0.00 | 0.00 | 0.00 |
| 175AMV | 71.15 | 1.09 | 1.56 | 0.98 | 15.15 | 0.39 | 0.11 | 5.87 | 0.00 | 0.95 | 0.78 | 0.00 | 0.00 | 0.00 | 0.00 | 0.00 |
| 175AMW | 71.15 | 1.09 | 1.56 | 4.91 | 11.22 | 0.39 | 0.11 | 5.87 | 0.00 | 0.95 | 0.78 | 0.00 | 0.00 | 0.00 | 0.00 | 0.00 |
| 175AMX | 71.15 | 1.09 | 1.56 | 7.86 | 8.27 | 0.39 | 0.11 | 5.87 | 0.00 | 0.95 | 0.78 | 0.00 | 0.00 | 0.00 | 0.00 | 0.00 |
| 175AMY | 71.15 | 1.09 | 1.56 | 0.00 | 8.27 | 8.25 | 0.11 | 5.87 | 0.00 | 0.95 | 0.78 | 0.00 | 0.00 | 0.00 | 0.00 | 0.00 |
| 175AMZ | 71.08 | 1.09 | 1.56 | 0.00 | 16.12 | 0.39 | 0.11 | 5.87 | 0.00 | 0.95 | 0.78 | 0.00 | 0.00 | 0.10 | 0.00 | 0.00 |

FIG. 5-A2

Sample Glass Compositions (mol%)

| SAMPLE ID | $SiO_2$ | $Al_2O_3$ | $B_2O_3$ | $Li_2O$ | $Na_2O$ | $K_2O$ | MgO | CaO | SrO | BaO | ZnO | $SnO_2$ | $ZrO_2$ | $Fe_2O_3$ | CoO | CuO |
|---|---|---|---|---|---|---|---|---|---|---|---|---|---|---|---|---|
| 175ARN | 70.49 | 5.80 | 0.00 | 8.00 | 3.72 | 0.00 | 2.60 | 7.40 | 2.00 | 0.00 | 0.00 | 0.00 | 0.00 | 0.00 | 0.00 | 0.00 |
| 175ARO | 70.49 | 5.80 | 0.00 | 7.00 | 4.72 | 0.00 | 2.60 | 7.40 | 2.00 | 0.00 | 0.00 | 0.00 | 0.00 | 0.00 | 0.00 | 0.00 |
| 175ARP | 69.79 | 6.73 | 0.00 | 7.92 | 3.68 | 0.00 | 2.57 | 7.33 | 1.98 | 0.00 | 0.00 | 0.00 | 0.00 | 0.00 | 0.00 | 0.00 |
| 175ARQ | 69.10 | 7.65 | 0.00 | 7.84 | 3.65 | 0.00 | 2.55 | 7.25 | 1.96 | 0.00 | 0.00 | 0.00 | 0.00 | 0.00 | 0.00 | 0.00 |
| 175ARR | 69.10 | 5.69 | 0.00 | 7.84 | 3.65 | 0.00 | 2.55 | 7.25 | 1.96 | 0.00 | 0.00 | 0.00 | 0.00 | 0.00 | 0.00 | 0.00 |
| 175ARS | 69.10 | 5.69 | 0.00 | 7.84 | 3.65 | 0.00 | 2.55 | 7.25 | 1.96 | 0.00 | 0.00 | 0.00 | 0.00 | 0.00 | 0.00 | 0.00 |
| 175ASD | 68.78 | 1.05 | 1.51 | 0.00 | 15.60 | 0.38 | 0.10 | 5.68 | 0.00 | 0.92 | 0.75 | 0.00 | 0.00 | 0.00 | 0.00 | 0.47 |
| 175ASE | 68.07 | 1.04 | 1.49 | 0.00 | 15.43 | 0.38 | 0.10 | 5.62 | 0.00 | 0.91 | 0.74 | 0.00 | 0.00 | 0.00 | 0.00 | 0.56 |
| 175ASF | 66.69 | 1.02 | 1.46 | 0.00 | 15.12 | 0.37 | 0.10 | 5.51 | 0.00 | 0.89 | 0.73 | 0.00 | 0.00 | 0.00 | 0.00 | 0.74 |
| 175ASG | 62.09 | 1.02 | 1.46 | 0.00 | 19.73 | 0.37 | 0.10 | 5.51 | 0.00 | 0.89 | 0.73 | 0.00 | 0.00 | 0.00 | 0.00 | 0.74 |
| 175ASH | 62.09 | 1.02 | 6.07 | 0.00 | 15.12 | 0.37 | 0.10 | 5.51 | 0.00 | 0.89 | 0.73 | 0.00 | 0.00 | 0.00 | 0.00 | 0.74 |
| 175ASI | 57.48 | 1.02 | 10.67 | 0.00 | 15.12 | 0.37 | 0.10 | 5.51 | 0.00 | 0.89 | 0.73 | 0.00 | 0.00 | 0.00 | 0.00 | 0.74 |
| 175ASJ | 62.09 | 1.02 | 1.46 | 0.00 | 15.12 | 0.37 | 0.10 | 5.51 | 0.00 | 5.50 | 0.73 | 0.00 | 0.00 | 0.00 | 0.00 | 0.74 |
| 175ATT | 70.00 | 0.00 | 0.00 | 7.00 | 7.00 | 7.00 | 3.00 | 3.00 | 0.00 | 3.00 | 0.00 | 0.00 | 0.00 | 0.00 | 0.00 | 0.00 |
| 175ATU | 65.67 | 0.00 | 0.00 | 6.57 | 6.57 | 6.57 | 2.81 | 2.81 | 0.00 | 2.81 | 0.00 | 0.00 | 0.00 | 0.00 | 0.00 | 0.56 |
| 175ATV | 64.34 | 0.00 | 0.00 | 6.43 | 6.43 | 6.43 | 2.76 | 2.76 | 0.00 | 2.76 | 0.00 | 0.00 | 0.00 | 0.00 | 0.00 | 0.74 |
| 175ATW | 63.06 | 0.00 | 0.00 | 6.31 | 6.31 | 6.31 | 2.70 | 2.70 | 0.00 | 2.70 | 0.00 | 0.00 | 0.00 | 0.00 | 0.00 | 0.90 |
| 175ATX | 64.34 | 0.00 | 0.00 | 6.43 | 6.43 | 6.43 | 1.84 | 1.84 | 0.00 | 1.84 | 2.76 | 0.00 | 0.00 | 0.00 | 0.00 | 0.74 |
| 175ATY | 59.74 | 0.00 | 4.60 | 6.43 | 6.43 | 6.43 | 2.76 | 2.76 | 0.00 | 2.76 | 0.00 | 0.00 | 0.00 | 0.00 | 0.00 | 0.74 |
| 175ATZ | 64.34 | 0.00 | 4.60 | 6.43 | 6.43 | 6.43 | 1.22 | 1.22 | 0.00 | 1.22 | 0.00 | 0.00 | 0.00 | 0.00 | 0.00 | 0.74 |
| 175AUA | 64.34 | 0.00 | 4.60 | 4.90 | 4.90 | 4.90 | 2.76 | 2.76 | 0.00 | 2.76 | 0.00 | 0.00 | 0.00 | 0.00 | 0.00 | 0.74 |
| 175AUB | 64.34 | 0.00 | 0.00 | 4.60 | 4.60 | 4.60 | 4.60 | 4.60 | 0.00 | 4.60 | 0.00 | 0.00 | 0.00 | 0.00 | 0.00 | 0.74 |
| 175AUC | 67.40 | 0.00 | 4.81 | 6.74 | 6.74 | 6.74 | 1.28 | 1.28 | 0.00 | 1.28 | 0.00 | 0.00 | 0.00 | 0.00 | 0.00 | 0.00 |
| 175AUD | 67.31 | 0.00 | 4.81 | 6.73 | 6.73 | 6.73 | 1.28 | 1.28 | 0.00 | 1.28 | 0.00 | 0.00 | 0.00 | 0.00 | 0.00 | 0.00 |
| 175AUE | 68.43 | 0.00 | 4.89 | 6.84 | 6.84 | 6.84 | 1.30 | 1.30 | 0.00 | 1.30 | 0.00 | 0.00 | 0.00 | 0.00 | 0.00 | 0.29 |
| 175AUF | 67.67 | 0.00 | 4.83 | 6.77 | 6.77 | 6.77 | 1.29 | 1.29 | 0.00 | 1.29 | 0.00 | 0.00 | 0.00 | 0.00 | 0.00 | 0.44 |
| 175AUG | 66.93 | 0.00 | 4.78 | 6.69 | 6.69 | 6.69 | 1.27 | 1.27 | 0.00 | 1.27 | 0.00 | 0.00 | 0.00 | 0.00 | 0.00 | 0.57 |
| 175AUH | 65.49 | 0.00 | 4.68 | 6.55 | 6.55 | 6.55 | 1.24 | 1.24 | 0.00 | 1.24 | 0.00 | 0.00 | 0.00 | 0.00 | 0.00 | 0.84 |
| 175AUI | 66.92 | 0.00 | 8.60 | 6.69 | 6.69 | 6.69 | 0.00 | 0.00 | 0.00 | 0.00 | 0.00 | 0.00 | 0.00 | 0.00 | 0.00 | 0.57 |
| 175AUJ | 63.10 | 0.00 | 8.61 | 6.69 | 6.69 | 6.69 | 1.27 | 1.27 | 0.00 | 1.27 | 0.00 | 0.00 | 0.00 | 0.00 | 0.00 | 0.57 |
| 175AUK | 60.24 | 0.00 | 11.47 | 6.69 | 6.69 | 6.69 | 1.27 | 1.27 | 0.00 | 1.27 | 0.00 | 0.00 | 0.00 | 0.00 | 0.00 | 0.57 |
| 175AUQ | 67.31 | 0.00 | 4.81 | 6.73 | 6.73 | 6.73 | 1.28 | 1.28 | 0.00 | 1.28 | 0.00 | 0.00 | 0.00 | 0.00 | 0.00 | 0.00 |
| 175AUR | 67.31 | 0.00 | 4.81 | 6.73 | 6.73 | 6.73 | 1.28 | 1.28 | 0.00 | 1.28 | 0.00 | 0.00 | 0.00 | 0.00 | 0.00 | 0.00 |

FIG. 5-A3

Sample Glass Compositions (mol%)

| SAMPLE ID | $SiO_2$ | $Al_2O_3$ | $B_2O_3$ | $Li_2O$ | $Na_2O$ | $K_2O$ | MgO | CaO | SrO | BaO | ZnO | $SnO_2$ | $ZrO_2$ | $Fe_2O_3$ | CoO | CuO |
|---|---|---|---|---|---|---|---|---|---|---|---|---|---|---|---|---|
| 175AUS | 67.18 | 0.00 | 4.80 | 6.72 | 6.72 | 6.72 | 1.28 | 1.28 | 0.00 | 1.28 | 0.00 | 0.19 | 0.00 | 0.00 | 0.00 | 0.00 |
| 175AUT | 65.67 | 0.00 | 4.69 | 6.57 | 6.57 | 6.57 | 1.25 | 1.25 | 0.00 | 1.25 | 0.00 | 0.00 | 0.00 | 0.00 | 0.00 | 0.56 |
| 175AUU | 65.55 | 0.00 | 4.68 | 6.55 | 6.55 | 6.55 | 1.25 | 1.25 | 0.00 | 1.25 | 0.00 | 0.00 | 0.00 | 0.00 | 0.00 | 0.75 |
| 175AUV | 64.34 | 0.00 | 4.60 | 6.43 | 6.43 | 6.43 | 1.22 | 1.22 | 0.00 | 1.22 | 0.00 | 0.00 | 0.00 | 0.00 | 0.00 | 0.74 |
| 175AUW | 64.34 | 0.00 | 4.60 | 4.60 | 8.27 | 6.43 | 1.22 | 1.22 | 0.00 | 1.22 | 0.00 | 0.00 | 0.00 | 0.00 | 0.00 | 0.74 |
| 175AUX | 64.34 | 0.00 | 4.60 | 4.60 | 10.11 | 4.60 | 1.22 | 1.22 | 0.00 | 1.22 | 0.00 | 0.00 | 0.00 | 0.00 | 0.00 | 0.74 |
| 175AUY | 61.59 | 0.00 | 7.35 | 6.43 | 6.43 | 6.43 | 1.22 | 1.22 | 0.00 | 1.22 | 0.00 | 0.00 | 0.00 | 0.00 | 0.00 | 0.74 |
| 175AVL | 66.01 | 0.00 | 9.00 | 7.00 | 7.00 | 7.00 | 1.33 | 1.33 | 0.00 | 1.33 | 0.00 | 0.00 | 0.00 | 0.00 | 0.00 | 0.00 |
| 175AVM | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AVN | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AVO | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AVP | 63.15 | 0.00 | 8.61 | 6.70 | 6.70 | 6.70 | 1.27 | 1.27 | 0.00 | 1.27 | 0.00 | 0.00 | 0.00 | 0.00 | 0.00 | 0.51 |
| 175AVQ | 65.61 | 0.00 | 8.95 | 6.96 | 6.96 | 6.96 | 1.32 | 1.32 | 0.00 | 1.32 | 0.00 | 0.00 | 0.00 | 0.00 | 0.00 | 0.60 |
| 175AVR | 63.10 | 0.00 | 8.61 | 6.69 | 6.69 | 6.69 | 1.27 | 1.27 | 0.00 | 1.27 | 0.00 | 0.00 | 0.00 | 0.00 | 0.00 | 0.57 |
| 175AVS | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AVT | 62.51 | 0.96 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AVU | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AVV | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AVW | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AVX | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AVY | 63.35 | 0.00 | 8.64 | 6.72 | 6.72 | 6.72 | 1.28 | 1.28 | 0.00 | 1.28 | 0.00 | 0.19 | 0.00 | 0.00 | 0.00 | 0.00 |
| 175AVZ | 63.35 | 0.00 | 8.64 | 6.72 | 6.72 | 6.72 | 1.28 | 1.28 | 0.00 | 1.28 | 0.00 | 0.19 | 0.00 | 0.00 | 0.00 | 0.00 |
| 175AWA | 63.35 | 0.00 | 8.64 | 6.72 | 6.72 | 6.72 | 1.28 | 1.28 | 0.00 | 1.28 | 0.00 | 0.19 | 0.00 | 0.00 | 0.00 | 0.00 |
| 175AWB | 63.35 | 0.00 | 8.64 | 6.72 | 6.72 | 6.72 | 1.28 | 1.28 | 0.00 | 1.28 | 0.00 | 0.19 | 0.00 | 0.00 | 0.00 | 0.00 |
| 175AWC | 63.35 | 0.00 | 8.64 | 5.76 | 5.76 | 8.64 | 1.28 | 1.28 | 0.00 | 1.28 | 0.00 | 0.00 | 0.00 | 0.00 | 0.00 | 0.00 |
| 175AQA | 67.19 | 1.03 | 1.48 | 0.00 | 15.23 | 0.37 | 0.10 | 5.55 | 0.00 | 0.90 | 0.73 | 0.00 | 0.00 | 0.00 | 0.00 | 0.00 |
| 175AQB | 67.19 | 1.03 | 1.48 | 0.00 | 15.23 | 0.37 | 0.10 | 5.55 | 0.00 | 0.90 | 0.73 | 0.00 | 0.00 | 0.00 | 0.00 | 0.00 |
| 175AQC | 67.19 | 1.03 | 1.48 | 0.00 | 15.23 | 0.37 | 0.10 | 5.55 | 0.00 | 0.90 | 0.73 | 0.00 | 0.00 | 0.00 | 0.00 | 0.00 |
| 175AQD | 67.16 | 1.03 | 1.47 | 0.00 | 15.23 | 0.37 | 0.10 | 5.55 | 0.00 | 0.90 | 0.73 | 0.00 | 0.00 | 0.00 | 0.00 | 0.00 |
| 175AQE | 67.19 | 1.03 | 1.48 | 0.00 | 15.23 | 0.37 | 0.10 | 5.55 | 0.00 | 0.90 | 0.73 | 0.00 | 0.00 | 0.00 | 0.00 | 0.00 |
| 175AQF | 66.69 | 1.02 | 1.46 | 0.00 | 15.12 | 0.37 | 0.10 | 5.51 | 0.00 | 0.89 | 0.73 | 0.00 | 0.00 | 0.00 | 0.00 | 0.74 |
| 175AQG | 64.09 | 0.98 | 1.41 | 0.00 | 14.53 | 0.35 | 0.10 | 5.29 | 0.00 | 0.86 | 0.70 | 0.00 | 0.00 | 0.00 | 0.00 | 1.06 |
| 175AQH | 66.69 | 1.02 | 1.46 | 0.00 | 15.12 | 0.37 | 0.10 | 5.51 | 0.00 | 0.89 | 0.73 | 0.00 | 0.00 | 0.00 | 0.00 | 0.74 |

FIG. 5-A4

Sample Glass Compositions (mol%)

| SAMPLE ID | $SiO_2$ | $Al_2O_3$ | $B_2O_3$ | $Li_2O$ | $Na_2O$ | $K_2O$ | MgO | CaO | SrO | BaO | ZnO | $SnO_2$ | $ZrO_2$ | $Fe_2O_3$ | CoO | CuO |
|---|---|---|---|---|---|---|---|---|---|---|---|---|---|---|---|---|
| 175AQI | 61.69 | 0.95 | 1.35 | 0.00 | 13.99 | 0.34 | 0.09 | 5.09 | 0.00 | 0.83 | 0.67 | 0.00 | 0.00 | 0.00 | 0.00 | 1.36 |
| 175AWG | 63.50 | 0.00 | 8.66 | 6.73 | 6.73 | 6.73 | 1.28 | 1.28 | 0.00 | 1.28 | 0.00 | 0.00 | 0.00 | 0.00 | 0.00 | 0.00 |
| 175AWH | 63.53 | 0.00 | 8.66 | 6.74 | 6.74 | 6.74 | 1.28 | 1.28 | 0.00 | 1.28 | 0.00 | 0.00 | 0.00 | 0.00 | 0.00 | 0.00 |
| 175AWI | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AWJ | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AWK | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 175AWL | 63.41 | 0.00 | 8.65 | 6.72 | 6.72 | 6.72 | 1.28 | 1.28 | 0.00 | 1.28 | 0.00 | 0.05 | 0.00 | 0.00 | 0.00 | 0.00 |
| 175AWM | 63.38 | 0.00 | 8.64 | 6.72 | 6.72 | 6.72 | 1.28 | 1.28 | 0.00 | 1.28 | 0.00 | 0.05 | 0.00 | 0.00 | 0.00 | 0.00 |
| 175AWN | 63.46 | 0.00 | 8.65 | 6.73 | 6.73 | 6.73 | 1.28 | 1.28 | 0.00 | 1.28 | 0.00 | 0.00 | 0.00 | 0.00 | 0.01 | 0.00 |
| 175AWO | 65.68 | 0.00 | 8.96 | 6.97 | 6.97 | 6.97 | 1.32 | 1.32 | 0.00 | 1.32 | 0.00 | 0.00 | 0.00 | 0.00 | 0.00 | 0.00 |
| 222EV | 63.47 | 0.00 | 8.65 | 6.73 | 6.73 | 6.73 | 1.28 | 1.28 | 0.00 | 1.28 | 0.00 | 0.00 | 0.00 | 0.00 | 0.00 | 0.00 |
| 222EW | 63.10 | 0.00 | 8.61 | 6.69 | 6.69 | 6.69 | 1.27 | 1.27 | 0.00 | 1.27 | 0.00 | 0.00 | 0.00 | 0.00 | 0.00 | 0.57 |
| 222EX | 72.13 | 1.11 | 1.58 | 0.00 | 16.35 | 0.40 | 0.11 | 5.96 | 0.00 | 0.97 | 0.80 | 0.00 | 0.00 | 0.00 | 0.00 | 0.60 |
| 222EY | 63.46 | 0.00 | 8.65 | 6.73 | 6.73 | 6.73 | 1.28 | 1.28 | 0.00 | 1.28 | 0.00 | 0.00 | 0.00 | 0.00 | 0.01 | 0.00 |
| 222EZ | 63.46 | 0.00 | 8.65 | 6.73 | 6.73 | 6.73 | 1.28 | 1.28 | 0.00 | 1.28 | 0.00 | 0.00 | 0.00 | 0.00 | 0.01 | 0.00 |
| 175AWP | 65.04 | 0.27 | 6.88 | 5.05 | 9.00 | 5.15 | 0.99 | 2.40 | 0.00 | 1.19 | 0.19 | 0.00 | 0.00 | 0.00 | 0.00 | 0.00 |
| 175AWQ | 66.62 | 0.53 | 5.10 | 3.37 | 11.27 | 3.56 | 0.69 | 3.52 | 0.00 | 1.11 | 0.38 | 0.00 | 0.00 | 0.00 | 0.00 | 0.00 |
| 175AWR | 68.20 | 0.80 | 3.32 | 1.69 | 13.54 | 1.97 | 0.40 | 4.64 | 0.00 | 1.02 | 0.57 | 0.00 | 0.00 | 0.00 | 0.00 | 0.00 |
| 175AWS | 65.38 | 0.00 | 4.81 | 4.81 | 8.65 | 6.73 | 1.44 | 2.16 | 0.00 | 2.16 | 0.00 | 0.00 | 0.00 | 0.00 | 0.00 | 0.00 |
| 175AWT | 67.53 | 0.54 | 5.17 | 3.41 | 11.43 | 3.61 | 0.70 | 3.57 | 0.00 | 1.12 | 0.39 | 0.00 | 0.00 | 0.00 | 0.00 | 0.59 |
| 175AWU | 65.01 | 0.00 | 6.69 | 4.78 | 8.60 | 6.69 | 1.43 | 2.15 | 0.00 | 2.15 | 0.00 | 0.00 | 0.00 | 0.00 | 0.00 | 0.57 |
| 222FA | 66.59 | 0.53 | 5.09 | 3.37 | 10.79 | 4.04 | 0.69 | 3.52 | 0.00 | 1.11 | 0.38 | 0.00 | 0.00 | 0.00 | 0.00 | 0.00 |
| 222FB | 66.24 | 0.53 | 5.07 | 3.35 | 10.73 | 4.02 | 0.69 | 3.50 | 0.00 | 1.10 | 0.38 | 0.00 | 0.00 | 0.00 | 0.00 | 0.57 |
| 222FC | 72.13 | 1.11 | 1.58 | 0.00 | 16.35 | 0.40 | 0.11 | 5.96 | 0.00 | 0.97 | 0.80 | 0.00 | 0.00 | 0.00 | 0.00 | 0.60 |
| 222FD | 66.58 | 0.53 | 5.09 | 3.37 | 10.78 | 4.04 | 0.69 | 3.52 | 0.00 | 1.11 | 0.38 | 0.00 | 0.00 | 0.00 | 0.01 | 0.00 |
| 222FE | 66.58 | 0.53 | 5.09 | 3.37 | 11.26 | 3.56 | 0.69 | 3.52 | 0.00 | 1.11 | 0.38 | 0.00 | 0.00 | 0.00 | 0.01 | 0.00 |
| 222FF | 66.59 | 0.53 | 5.09 | 3.37 | 10.30 | 4.52 | 0.69 | 3.52 | 0.00 | 1.11 | 0.38 | 0.00 | 0.00 | 0.00 | 0.00 | 0.00 |
| 222FM | 66.24 | 0.53 | 5.07 | 3.35 | 10.25 | 4.50 | 0.69 | 3.50 | 0.00 | 1.10 | 0.38 | 0.00 | 0.00 | 0.00 | 0.00 | 0.57 |
| 222FN | 72.13 | 1.11 | 1.58 | 0.00 | 16.35 | 0.40 | 0.61 | 5.46 | 0.00 | 0.97 | 0.80 | 0.00 | 0.00 | 0.00 | 0.00 | 0.60 |
| 222FO | 66.58 | 0.53 | 5.09 | 3.37 | 10.30 | 4.52 | 0.69 | 3.52 | 0.00 | 1.11 | 0.38 | 0.00 | 0.00 | 0.00 | 0.01 | 0.00 |
| 222FP | 66.58 | 0.53 | 5.09 | 3.37 | 11.75 | 3.08 | 0.69 | 3.52 | 0.00 | 1.11 | 0.38 | 0.00 | 0.00 | 0.00 | 0.01 | 0.00 |
| 222FQ | 66.59 | 0.53 | 5.09 | 3.37 | 11.75 | 3.08 | 0.69 | 3.52 | 0.00 | 1.11 | 0.38 | 0.00 | 0.00 | 0.00 | 0.00 | 0.00 |

FIG. 5-B1

Sample Glass Compositions (mol%)

| SAMPLE ID | $Y_2O_3$ | $La_2O_3$ | $Ce_2O_3$ | $Pr_2O_3$ | $Nd_2O_3$ | $Sm_2O_3$ | $Eu_2O_3$ | $Tb_2O_3$ | $Ho_2O_3$ | $Sb_2O_3$ | Ag | $MnO_2$ | $R_2O$-RO | $R_2O$/RO | Total $RE_2O_3$ |
|---|---|---|---|---|---|---|---|---|---|---|---|---|---|---|---|
| 175AFM | 0.00 | 0.00 | 0.00 | 0.00 | 0.00 | 0.00 | 0.00 | 0.00 | 0.00 | 0.00 | 0.00 | 0.00 | 0.17 | 1.01 | 0.00 |
| 175AFN | 0.00 | 0.00 | 0.00 | 0.00 | 0.00 | 0.00 | 0.00 | 0.00 | 0.50 | 0.00 | 0.00 | 0.00 | 0.17 | 1.01 | 0.50 |
| 175AFO | 0.00 | 0.00 | 0.00 | 0.00 | 0.00 | 0.00 | 0.00 | 0.00 | 0.99 | 0.00 | 0.00 | 0.00 | 0.17 | 1.01 | 0.99 |
| 175AFP | 0.00 | 0.00 | 0.00 | 0.00 | 0.00 | 0.00 | 0.00 | 0.00 | 1.97 | 0.00 | 0.00 | 0.00 | 0.17 | 1.01 | 1.97 |
| 175AFQ | 0.00 | 0.00 | 0.00 | 0.00 | 0.00 | 0.00 | 0.00 | 0.00 | 1.95 | 0.00 | 0.00 | 0.00 | 0.17 | 1.01 | 1.95 |
| 175AFR | 0.00 | 0.00 | 0.00 | 0.00 | 0.00 | 0.00 | 0.00 | 0.00 | 1.91 | 0.00 | 0.00 | 0.00 | 0.16 | 1.01 | 1.91 |
| 175AFS | 0.00 | 0.00 | 0.00 | 0.00 | 0.98 | 0.00 | 0.00 | 0.00 | 0.98 | 0.00 | 0.00 | 0.00 | 0.17 | 1.01 | 1.97 |
| 175AFT | 0.00 | 0.00 | 0.00 | 0.00 | 0.00 | 0.00 | 0.00 | 0.00 | 1.97 | 0.00 | 0.00 | 0.00 | 0.17 | 1.01 | 1.97 |
| 175AFU | 0.00 | 0.00 | 0.00 | 0.00 | 0.00 | 0.00 | 0.00 | 0.00 | 1.96 | 0.00 | 0.00 | 0.00 | 0.17 | 1.01 | 1.96 |
| 175AFV | 0.00 | 0.00 | 0.00 | 0.00 | 0.00 | 0.00 | 0.00 | 0.00 | 1.92 | 0.00 | 0.00 | 0.00 | 2.33 | 1.18 | 1.92 |
| 175AFW | 0.00 | 0.00 | 0.00 | 0.00 | 0.00 | 0.00 | 0.00 | 0.00 | 1.89 | 0.00 | 0.00 | 0.00 | 3.99 | 1.32 | 1.89 |
| 175AFX | 0.00 | 0.00 | 0.00 | 0.00 | 0.00 | 0.00 | 0.00 | 0.00 | 1.93 | 0.00 | 0.00 | 0.00 | -1.72 | 0.88 | 1.93 |
| 175AFY | 0.00 | 0.00 | 0.00 | 0.00 | 0.00 | 0.00 | 0.00 | 0.00 | 1.89 | 0.00 | 0.00 | 0.00 | -3.58 | 0.78 | 1.89 |
| 175AFZ | 0.00 | 0.00 | 0.00 | 0.00 | 0.00 | 0.00 | 0.00 | 0.00 | 1.93 | 0.00 | 0.00 | 0.00 | -1.72 | 0.88 | 1.93 |
| 175AGA | 0.00 | 0.00 | 0.00 | 0.00 | 0.00 | 0.00 | 0.00 | 0.00 | 1.93 | 0.00 | 0.00 | 0.00 | 0.21 | 1.02 | 1.93 |
| 175AGB | 0.00 | 0.00 | 0.00 | 0.00 | 0.00 | 0.00 | 0.00 | 0.00 | 1.89 | 0.00 | 0.00 | 0.00 | 0.21 | 1.02 | 1.89 |
| 175AGC | 0.00 | 0.00 | 0.00 | 0.00 | 0.00 | 0.00 | 0.00 | 0.00 | 1.93 | 0.00 | 0.00 | 0.00 | 0.21 | 1.02 | 1.93 |
| 175AGD | 0.00 | 0.00 | 0.00 | 0.00 | 0.00 | 0.00 | 0.00 | 0.00 | 1.89 | 0.00 | 0.00 | 0.00 | 0.21 | 1.02 | 1.89 |
| 175ALW | 0.00 | 0.00 | 0.39 | 0.00 | 0.00 | 0.00 | 1.57 | 0.00 | 0.00 | 0.00 | 0.00 | 0.00 | 8.81 | 2.14 | 1.96 |
| 175ALX | 0.00 | 0.00 | 0.00 | 0.00 | 0.00 | 0.00 | 0.00 | 0.00 | 1.96 | 0.00 | 0.00 | 0.00 | 8.81 | 2.14 | 1.96 |
| 175ALY | 0.00 | 0.00 | 0.00 | 0.00 | 0.00 | 0.00 | 0.00 | 0.00 | 1.96 | 0.00 | 0.00 | 0.00 | 8.81 | 2.14 | 1.96 |
| 175ALZ | 0.00 | 0.00 | 0.00 | 0.00 | 0.00 | 0.00 | 0.00 | 0.00 | 1.96 | 0.00 | 0.00 | 0.00 | 8.80 | 2.14 | 1.96 |
| 175AMA | 0.00 | 0.00 | 0.00 | 0.88 | 1.08 | 0.00 | 0.00 | 0.00 | 0.00 | 0.00 | 0.00 | 0.00 | 8.81 | 2.14 | 1.96 |
| 175AMB | 0.00 | 0.00 | 0.00 | 0.00 | 1.96 | 0.00 | 0.00 | 0.00 | 0.00 | 0.00 | 0.00 | 0.00 | 8.81 | 2.14 | 1.96 |
| 175AMR | 0.00 | 0.00 | 0.49 | 0.00 | 0.00 | 0.00 | 0.00 | 1.47 | 0.00 | 0.00 | 0.00 | 0.00 | 8.81 | 2.14 | 1.96 |
| 175AMS | 0.00 | 0.00 | 0.49 | 0.00 | 0.00 | 0.00 | 0.00 | 1.47 | 0.00 | 0.00 | 0.00 | 0.00 | 8.81 | 2.14 | 1.96 |
| 175AMT | 0.00 | 0.00 | 1.48 | 0.00 | 0.00 | 0.00 | 0.00 | 0.00 | 0.00 | 0.00 | 0.00 | 0.00 | 8.86 | 2.14 | 1.48 |
| 175AMU | 0.00 | 0.00 | 0.00 | 0.00 | 0.00 | 0.00 | 0.00 | 1.47 | 0.00 | 0.00 | 0.00 | 0.00 | 8.81 | 2.14 | 1.47 |
| 175AMV | 0.00 | 0.00 | 0.49 | 0.00 | 0.00 | 0.00 | 0.00 | 1.47 | 0.00 | 0.00 | 0.00 | 0.00 | 8.81 | 2.14 | 1.96 |
| 175AMW | 0.00 | 0.00 | 0.49 | 0.00 | 0.00 | 0.00 | 0.00 | 1.47 | 0.00 | 0.00 | 0.00 | 0.00 | 8.81 | 2.14 | 1.96 |
| 175AMX | 0.00 | 0.00 | 0.49 | 0.00 | 0.00 | 0.00 | 0.00 | 1.47 | 0.00 | 0.00 | 0.00 | 0.00 | 8.81 | 2.14 | 1.96 |
| 175AMY | 0.00 | 0.00 | 0.49 | 0.00 | 0.00 | 0.00 | 0.00 | 1.47 | 0.00 | 0.00 | 0.00 | 0.00 | 8.81 | 2.14 | 1.96 |
| 175AMZ | 0.00 | 0.00 | 0.49 | 0.00 | 0.00 | 0.00 | 0.00 | 1.47 | 0.00 | 0.00 | 0.00 | 0.00 | 8.80 | 2.14 | 1.96 |

FIG. 5-B2

Sample Glass Compositions (mol%)

| SAMPLE ID | $Y_2O_3$ | $La_2O_3$ | $Ce_2O_3$ | $Pr_2O_3$ | $Nd_2O_3$ | $Sm_2O_3$ | $Eu_2O_3$ | $Tb_2O_3$ | $Ho_2O_3$ | $Sb_2O_3$ | Ag | $MnO_2$ | $R_2O$-RO | $R_2O$/RO | Total $RE_2O_3$ |
|---|---|---|---|---|---|---|---|---|---|---|---|---|---|---|---|
| 175ARN | 0.00 | 0.00 | 0.00 | 0.00 | 0.00 | 0.00 | 0.00 | 0.00 | 0.00 | 0.00 | 0.00 | 0.00 | -0.28 | 0.98 | 0.00 |
| 175ARO | 0.00 | 0.00 | 0.00 | 0.00 | 0.00 | 0.00 | 0.00 | 0.00 | 0.00 | 0.00 | 0.00 | 0.00 | -0.28 | 0.98 | 0.00 |
| 175ARP | 0.00 | 0.00 | 0.00 | 0.00 | 0.00 | 0.00 | 0.00 | 0.00 | 0.00 | 0.00 | 0.00 | 0.00 | -0.28 | 0.98 | 0.00 |
| 175ARQ | 0.00 | 0.00 | 0.00 | 0.00 | 0.00 | 0.00 | 0.00 | 0.00 | 0.00 | 0.00 | 0.00 | 0.00 | -0.27 | 0.98 | 0.00 |
| 175ARR | 1.96 | 0.00 | 0.00 | 0.00 | 0.00 | 0.00 | 0.00 | 0.00 | 0.00 | 0.00 | 0.00 | 0.00 | -0.27 | 0.98 | 1.96 |
| 175ARS | 0.00 | 1.96 | 0.00 | 0.00 | 0.00 | 0.00 | 0.00 | 0.00 | 0.00 | 0.00 | 0.00 | 0.00 | -0.27 | 0.98 | 1.96 |
| 175ASD | 0.00 | 0.00 | 0.00 | 3.09 | 1.66 | 0.00 | 0.00 | 0.00 | 0.00 | 0.00 | 0.00 | 0.00 | 8.52 | 2.14 | 4.75 |
| 175ASE | 0.00 | 0.00 | 0.00 | 3.67 | 1.97 | 0.00 | 0.00 | 0.00 | 0.00 | 0.00 | 0.00 | 0.00 | 8.43 | 2.14 | 5.64 |
| 175ASF | 0.00 | 0.00 | 0.00 | 4.79 | 2.58 | 0.00 | 0.00 | 0.00 | 0.00 | 0.00 | 0.00 | 0.00 | 8.26 | 2.14 | 7.37 |
| 175ASG | 0.00 | 0.00 | 0.00 | 4.79 | 2.58 | 0.00 | 0.00 | 0.00 | 0.00 | 0.00 | 0.00 | 0.00 | 12.86 | 2.78 | 7.37 |
| 175ASH | 0.00 | 0.00 | 0.00 | 4.79 | 2.58 | 0.00 | 0.00 | 0.00 | 0.00 | 0.00 | 0.00 | 0.00 | 8.26 | 2.14 | 7.37 |
| 175ASI | 0.00 | 0.00 | 0.00 | 4.79 | 2.58 | 0.00 | 0.00 | 0.00 | 0.00 | 0.00 | 0.00 | 0.00 | 8.26 | 2.14 | 7.37 |
| 175ASJ | 0.00 | 0.00 | 0.00 | 4.79 | 2.58 | 0.00 | 0.00 | 0.00 | 0.00 | 0.00 | 0.00 | 0.00 | 3.66 | 1.31 | 7.37 |
| 175ATT | 0.00 | 0.00 | 0.00 | 0.00 | 0.00 | 0.00 | 0.00 | 0.00 | 0.00 | 0.00 | 0.00 | 0.00 | 12.00 | 2.33 | 0.00 |
| 175ATU | 0.00 | 3.66 | 0.00 | 0.00 | 0.00 | 0.00 | 1.97 | 0.00 | 0.00 | 0.00 | 0.00 | 0.00 | 11.26 | 2.33 | 5.63 |
| 175ATV | 0.00 | 4.78 | 0.00 | 0.00 | 0.00 | 0.00 | 2.57 | 0.00 | 0.00 | 0.00 | 0.00 | 0.00 | 11.03 | 2.33 | 7.35 |
| 175ATW | 0.00 | 5.86 | 0.00 | 0.00 | 0.00 | 0.00 | 3.15 | 0.00 | 0.00 | 0.00 | 0.00 | 0.00 | 10.81 | 2.33 | 9.01 |
| 175ATX | 0.00 | 4.78 | 0.00 | 0.00 | 0.00 | 0.00 | 2.57 | 0.00 | 0.00 | 0.00 | 0.00 | 0.00 | 11.03 | 2.33 | 7.35 |
| 175ATY | 0.00 | 4.78 | 0.00 | 0.00 | 0.00 | 0.00 | 2.57 | 0.00 | 0.00 | 0.00 | 0.00 | 0.00 | 11.03 | 2.33 | 7.35 |
| 175ATZ | 0.00 | 4.78 | 0.00 | 0.00 | 0.00 | 0.00 | 2.57 | 0.00 | 0.00 | 0.00 | 0.00 | 0.00 | 15.64 | 5.26 | 7.35 |
| 175AUA | 0.00 | 4.78 | 0.00 | 0.00 | 0.00 | 0.00 | 2.57 | 0.00 | 0.00 | 0.00 | 0.00 | 0.00 | 6.43 | 1.78 | 7.35 |
| 175AUB | 0.00 | 4.78 | 0.00 | 0.00 | 0.00 | 0.00 | 2.57 | 0.00 | 0.00 | 0.00 | 0.00 | 0.00 | 0.00 | 1.00 | 7.35 |
| 175AUC | 0.00 | 0.00 | 0.00 | 0.00 | 0.00 | 0.00 | 0.00 | 3.73 | 0.00 | 0.00 | 0.00 | 0.00 | 16.38 | 5.26 | 3.73 |
| 175AUD | 0.00 | 0.00 | 0.00 | 0.00 | 0.00 | 0.00 | 3.85 | 0.00 | 0.00 | 0.00 | 0.00 | 0.00 | 16.36 | 5.26 | 3.85 |
| 175AUE | 0.00 | 0.00 | 0.00 | 0.00 | 0.00 | 0.00 | 0.00 | 0.00 | 1.96 | 0.00 | 0.00 | 0.00 | 16.63 | 5.26 | 1.96 |
| 175AUF | 0.00 | 0.00 | 0.00 | 0.00 | 0.00 | 0.00 | 0.00 | 0.00 | 2.90 | 0.00 | 0.00 | 0.00 | 16.44 | 5.26 | 2.90 |
| 175AUG | 0.00 | 0.00 | 0.00 | 0.00 | 0.00 | 0.00 | 0.00 | 0.00 | 3.82 | 0.00 | 0.00 | 0.00 | 16.26 | 5.26 | 3.82 |
| 175AUH | 0.00 | 0.00 | 0.00 | 0.00 | 0.00 | 0.00 | 0.00 | 0.00 | 5.61 | 0.00 | 0.00 | 0.00 | 15.91 | 5.26 | 5.61 |
| 175AUI | 0.00 | 0.00 | 0.00 | 0.00 | 0.00 | 0.00 | 0.00 | 0.00 | 3.82 | 0.00 | 0.00 | 0.00 | 20.08 | | 3.82 |
| 175AUJ | 0.00 | 0.00 | 0.00 | 0.00 | 0.00 | 0.00 | 0.00 | 0.00 | 3.82 | 0.00 | 0.00 | 0.00 | 16.26 | 5.26 | 3.82 |
| 175AUK | 0.00 | 0.00 | 0.00 | 0.00 | 0.00 | 0.00 | 0.00 | 0.00 | 3.82 | 0.00 | 0.00 | 0.00 | 16.26 | 5.26 | 3.82 |
| 175AUQ | 0.00 | 0.00 | 0.00 | 0.00 | 0.00 | 0.00 | 3.85 | 0.00 | 0.00 | 0.00 | 0.00 | 0.00 | 16.36 | 5.26 | 3.85 |
| 175AUR | 0.00 | 0.00 | 0.00 | 0.00 | 0.00 | 0.00 | 3.85 | 0.00 | 0.00 | 0.00 | 0.00 | 0.00 | 16.36 | 5.26 | 3.85 |

FIG. 5-B3

Sample Glass Compositions (mol%)

| SAMPLE ID | $Y_2O_3$ | $La_2O_3$ | $Ce_2O_3$ | $Pr_2O_3$ | $Nd_2O_3$ | $Sm_2O_3$ | $Eu_2O_3$ | $Tb_2O_3$ | $Ho_2O_3$ | $Sb_2O_3$ | Ag | $MnO_2$ | $R_2O$-RO | $R_2O$/RO | Total $RE_2O_3$ |
|---|---|---|---|---|---|---|---|---|---|---|---|---|---|---|---|
| 175AUS | 0.00 | 0.00 | 0.00 | 0.00 | 0.00 | 0.00 | 3.84 | 0.00 | 0.00 | 0.00 | 0.00 | 0.00 | 16.33 | 5.26 | 3.84 |
| 175AUT | 0.00 | 0.00 | 0.00 | 1.97 | 3.66 | 0.00 | 0.00 | 0.00 | 0.00 | 0.00 | 0.00 | 0.00 | 15.96 | 5.26 | 5.63 |
| 175AUU | 0.00 | 0.00 | 0.00 | 1.97 | 3.65 | 0.00 | 0.00 | 0.00 | 0.00 | 0.00 | 0.00 | 0.00 | 15.93 | 5.26 | 5.62 |
| 175AUV | 0.00 | 0.00 | 0.00 | 2.57 | 4.78 | 0.00 | 0.00 | 0.00 | 0.00 | 0.00 | 0.00 | 0.00 | 15.64 | 5.26 | 7.35 |
| 175AUW | 0.00 | 0.00 | 0.00 | 2.57 | 4.78 | 0.00 | 0.00 | 0.00 | 0.00 | 0.00 | 0.00 | 0.00 | 15.64 | 5.26 | 7.35 |
| 175AUX | 0.00 | 0.00 | 0.00 | 2.57 | 4.78 | 0.00 | 0.00 | 0.00 | 0.00 | 0.00 | 0.00 | 0.00 | 15.64 | 5.26 | 7.35 |
| 175AUY | 0.00 | 0.00 | 0.00 | 2.57 | 4.78 | 0.00 | 0.00 | 0.00 | 0.00 | 0.00 | 0.00 | 0.00 | 15.64 | 5.26 | 7.35 |
| 175AVL | 0.00 | 0.00 | 0.00 | 0.00 | 0.00 | 0.00 | 0.00 | 0.00 | 0.00 | 0.00 | 0.00 | 0.00 | 17.01 | 5.26 | 0.00 |
| 175AVM | 3.85 | 0.00 | 0.00 | 0.00 | 0.00 | 0.00 | 0.00 | 0.00 | 0.00 | 0.00 | 0.00 | 0.00 | 16.36 | 5.26 | 3.85 |
| 175AVN | 0.00 | 3.85 | 0.00 | 0.00 | 0.00 | 0.00 | 0.00 | 0.00 | 0.00 | 0.00 | 0.00 | 0.00 | 16.36 | 5.26 | 3.85 |
| 175AVO | 0.00 | 0.00 | 0.00 | 1.35 | 2.50 | 0.00 | 0.00 | 0.00 | 0.00 | 0.00 | 0.00 | 0.00 | 16.36 | 5.26 | 3.85 |
| 175AVP | 0.00 | 0.00 | 0.00 | 1.34 | 2.49 | 0.00 | 0.00 | 0.00 | 0.00 | 0.00 | 0.00 | 0.00 | 16.27 | 5.26 | 3.83 |
| 175AVQ | 0.00 | 0.00 | 0.00 | 0.00 | 0.00 | 0.00 | 0.00 | 0.00 | 0.00 | 0.00 | 0.00 | 0.00 | 16.91 | 5.26 | 0.00 |
| 175AVR | 0.00 | 0.00 | 0.00 | 0.00 | 0.00 | 0.00 | 0.00 | 0.00 | 3.82 | 0.00 | 0.00 | 0.00 | 16.26 | 5.26 | 3.82 |
| 175AVS | 0.00 | 0.00 | 0.00 | 0.00 | 0.00 | 0.00 | 0.00 | 0.00 | 3.85 | 0.00 | 0.00 | 0.00 | 16.36 | 5.26 | 3.85 |
| 175AVT | 0.00 | 0.00 | 0.00 | 0.00 | 0.00 | 0.00 | 0.00 | 0.00 | 3.85 | 0.00 | 0.00 | 0.00 | 16.36 | 5.26 | 3.85 |
| 175AVU | 3.65 | 0.00 | 0.19 | 0.00 | 0.00 | 0.00 | 0.00 | 0.00 | 0.00 | 0.00 | 0.00 | 0.00 | 16.36 | 5.26 | 3.85 |
| 175AVV | 3.46 | 0.00 | 0.38 | 0.00 | 0.00 | 0.00 | 0.00 | 0.00 | 0.00 | 0.00 | 0.00 | 0.00 | 16.36 | 5.26 | 3.85 |
| 175AVW | 0.00 | 0.00 | 0.38 | 0.00 | 0.00 | 0.00 | 0.00 | 3.46 | 0.00 | 0.00 | 0.00 | 0.00 | 16.36 | 5.26 | 3.85 |
| 175AVX | 0.00 | 0.00 | 0.00 | 0.00 | 0.00 | 0.00 | 0.00 | 3.85 | 0.00 | 0.00 | 0.00 | 0.00 | 16.36 | 5.26 | 3.85 |
| 175AVY | 0.00 | 0.00 | 0.00 | 0.00 | 0.00 | 0.00 | 0.48 | 3.36 | 0.00 | 0.00 | 0.00 | 0.00 | 16.33 | 5.26 | 3.84 |
| 175AVZ | 0.00 | 0.00 | 0.00 | 0.00 | 0.00 | 0.00 | 0.96 | 2.88 | 0.00 | 0.00 | 0.00 | 0.00 | 16.33 | 5.26 | 3.84 |
| 175AWA | 0.00 | 0.00 | 0.00 | 0.00 | 0.00 | 0.00 | 3.84 | 0.00 | 0.00 | 0.00 | 0.00 | 0.00 | 16.33 | 5.26 | 3.84 |
| 175AWB | 0.00 | 0.00 | 0.00 | 0.00 | 0.00 | 3.84 | 0.00 | 0.00 | 0.00 | 0.00 | 0.00 | 0.00 | 16.33 | 5.26 | 3.84 |
| 175AWC | 0.00 | 0.00 | 0.19 | 0.00 | 0.00 | 0.00 | 3.84 | 0.00 | 0.00 | 0.00 | 0.00 | 0.00 | 16.33 | 5.26 | 4.03 |
| 175AQA | 0.00 | 0.00 | 0.00 | 0.00 | 0.00 | 0.00 | 0.09 | 7.33 | 0.00 | 0.00 | 0.00 | 0.00 | 8.32 | 2.14 | 7.42 |
| 175AQB | 0.00 | 0.00 | 0.00 | 0.00 | 0.00 | 0.00 | 0.46 | 6.96 | 0.00 | 0.00 | 0.00 | 0.00 | 8.32 | 2.14 | 7.42 |
| 175AQC | 0.00 | 0.00 | 0.00 | 0.00 | 0.00 | 0.00 | 0.93 | 6.49 | 0.00 | 0.00 | 0.00 | 0.00 | 8.32 | 2.14 | 7.42 |
| 175AQD | 0.00 | 0.00 | 0.05 | 0.00 | 0.00 | 0.00 | 0.46 | 6.95 | 0.00 | 0.00 | 0.00 | 0.00 | 8.32 | 2.14 | 7.46 |
| 175AQE | 0.00 | 0.00 | 0.00 | 0.00 | 0.00 | 0.00 | 0.46 | 6.96 | 0.00 | 0.00 | 0.00 | 0.00 | 8.32 | 2.14 | 7.42 |
| 175AQF | 0.00 | 0.00 | 0.00 | 0.00 | 0.00 | 0.00 | 0.00 | 0.00 | 7.37 | 0.00 | 0.00 | 0.00 | 8.26 | 2.14 | 7.37 |
| 175AQG | 0.00 | 0.00 | 0.00 | 0.00 | 0.00 | 0.00 | 0.00 | 0.00 | 10.62 | 0.00 | 0.00 | 0.00 | 7.94 | 2.14 | 10.62 |
| 175AQH | 0.00 | 0.00 | 0.00 | 2.58 | 4.79 | 0.00 | 0.00 | 0.00 | 0.00 | 0.00 | 0.00 | 0.00 | 8.26 | 2.14 | 7.37 |

FIG. 5-B4

Sample Glass Compositions (mol%)

| SAMPLE ID | $Y_2O_3$ | $La_2O_3$ | $Ce_2O_3$ | $Pr_2O_3$ | $Nd_2O_3$ | $Sm_2O_3$ | $Eu_2O_3$ | $Tb_2O_3$ | $Ho_2O_3$ | $Sb_2O_3$ | Ag | $MnO_2$ | $R_2O$-RO | $R_2O$/RO | Total $RE_2O_3$ |
|---|---|---|---|---|---|---|---|---|---|---|---|---|---|---|---|
| 175AQI | 0.00 | 0.00 | 0.00 | 4.77 | 8.86 | 0.00 | 0.00 | 0.00 | 0.00 | 0.00 | 0.00 | 0.00 | 7.64 | 2.14 | 13.63 |
| 175AWG | 3.75 | 0.00 | 0.05 | 0.00 | 0.00 | 0.00 | 0.00 | 0.00 | 0.00 | 0.00 | 0.00 | 0.00 | 16.37 | 5.26 | 3.80 |
| 175AWH | 3.66 | 0.00 | 0.10 | 0.00 | 0.00 | 0.00 | 0.00 | 0.00 | 0.00 | 0.00 | 0.00 | 0.00 | 16.37 | 5.26 | 3.75 |
| 175AWI | 0.00 | 0.00 | 0.00 | 0.00 | 3.85 | 0.00 | 0.00 | 0.00 | 0.00 | 0.00 | 0.00 | 0.00 | 16.36 | 5.26 | 3.85 |
| 175AWJ | 0.00 | 0.00 | 0.00 | 0.00 | 1.92 | 0.00 | 0.00 | 0.00 | 1.92 | 0.00 | 0.00 | 0.00 | 16.36 | 5.26 | 3.85 |
| 175AWK | 0.00 | 0.00 | 0.00 | 0.00 | 2.40 | 0.00 | 0.00 | 0.00 | 1.44 | 0.00 | 0.00 | 0.00 | 16.36 | 5.26 | 3.85 |
| 175AWL | 0.00 | 0.00 | 0.00 | 0.00 | 0.00 | 0.00 | 0.00 | 0.00 | 3.84 | 0.00 | 0.05 | 0.00 | 16.34 | 5.26 | 3.84 |
| 175AWM | 0.00 | 0.00 | 0.00 | 0.00 | 0.00 | 0.00 | 0.00 | 0.00 | 3.84 | 0.00 | 0.10 | 0.00 | 16.33 | 5.26 | 3.84 |
| 175AWN | 0.00 | 0.00 | 0.00 | 0.00 | 0.00 | 0.00 | 0.00 | 0.00 | 3.85 | 0.00 | 0.00 | 0.00 | 16.36 | 5.26 | 3.85 |
| 175AWO | 0.00 | 0.00 | 0.00 | 0.00 | 0.00 | 0.00 | 0.00 | 0.00 | 0.00 | 0.00 | 0.00 | 0.50 | 16.93 | 5.26 | 0.00 |
| 222EV | 0.00 | 0.00 | 0.00 | 0.00 | 0.00 | 0.00 | 0.00 | 0.00 | 3.85 | 0.00 | 0.00 | 0.00 | 16.36 | 5.26 | 3.85 |
| 222EW | 0.00 | 0.00 | 0.00 | 0.00 | 0.00 | 0.00 | 0.00 | 0.00 | 3.82 | 0.00 | 0.00 | 0.00 | 16.26 | 5.26 | 3.82 |
| 222EX | 0.00 | 0.00 | 0.00 | 0.00 | 0.00 | 0.00 | 0.00 | 0.00 | 0.00 | 0.00 | 0.00 | 0.00 | 8.92 | 2.14 | 0.00 |
| 222EY | 0.00 | 0.00 | 0.00 | 0.00 | 0.00 | 0.00 | 0.00 | 0.00 | 3.85 | 0.00 | 0.00 | 0.00 | 16.36 | 5.26 | 3.85 |
| 222EZ | 0.00 | 0.00 | 0.00 | 1.54 | 2.31 | 0.00 | 0.00 | 0.00 | 0.00 | 0.00 | 0.00 | 0.00 | 16.35 | 5.26 | 3.85 |
| 175AWP | 0.00 | 0.00 | 0.00 | 0.00 | 0.00 | 0.00 | 0.00 | 0.00 | 3.85 | 0.00 | 0.00 | 0.00 | 14.43 | 4.03 | 3.85 |
| 175AWQ | 0.00 | 0.00 | 0.00 | 0.00 | 0.00 | 0.00 | 0.00 | 0.00 | 3.85 | 0.00 | 0.00 | 0.00 | 12.50 | 3.19 | 3.85 |
| 175AWR | 0.00 | 0.00 | 0.00 | 0.00 | 0.00 | 0.00 | 0.00 | 0.00 | 3.85 | 0.00 | 0.00 | 0.00 | 10.57 | 2.59 | 3.85 |
| 175AWS | 0.00 | 0.00 | 0.00 | 0.00 | 0.00 | 0.00 | 0.00 | 0.00 | 3.85 | 0.00 | 0.00 | 0.00 | 14.42 | 3.50 | 3.85 |
| 175AWT | 1.95 | 0.00 | 0.00 | 0.00 | 0.00 | 0.00 | 0.00 | 0.00 | 0.00 | 0.00 | 0.00 | 0.00 | 12.67 | 3.19 | 1.95 |
| 175AWU | 1.91 | 0.00 | 0.00 | 0.00 | 0.00 | 0.00 | 0.00 | 0.00 | 0.00 | 0.00 | 0.00 | 0.00 | 14.34 | 3.50 | 1.91 |
| 222FA | 0.00 | 0.00 | 0.00 | 0.00 | 0.00 | 0.00 | 0.00 | 0.00 | 3.85 | 0.05 | 0.00 | 0.00 | 12.50 | 3.19 | 3.85 |
| 222FB | 0.00 | 0.00 | 0.00 | 0.00 | 0.00 | 0.00 | 0.00 | 0.00 | 3.83 | 0.00 | 0.00 | 0.00 | 12.43 | 3.19 | 3.83 |
| 222FC | 0.00 | 0.00 | 0.00 | 0.00 | 0.00 | 0.00 | 0.00 | 0.00 | 0.00 | 0.00 | 0.00 | 0.00 | 8.92 | 2.14 | 0.00 |
| 222FD | 0.00 | 0.00 | 0.00 | 0.00 | 0.00 | 0.00 | 0.00 | 0.00 | 3.85 | 0.05 | 0.00 | 0.00 | 12.50 | 3.19 | 3.85 |
| 222FE | 0.00 | 0.00 | 0.00 | 1.54 | 2.31 | 0.00 | 0.00 | 0.00 | 0.00 | 0.05 | 0.00 | 0.00 | 12.50 | 3.19 | 3.85 |
| 222FF | 0.00 | 0.00 | 0.00 | 0.00 | 0.00 | 0.00 | 0.00 | 0.00 | 3.85 | 0.05 | 0.00 | 0.00 | 12.50 | 3.19 | 3.85 |
| 222FM | 0.00 | 0.00 | 0.00 | 0.00 | 0.00 | 0.00 | 0.00 | 0.00 | 3.83 | 0.00 | 0.00 | 0.00 | 12.43 | 3.19 | 3.83 |
| 222FN | 0.00 | 0.00 | 0.00 | 0.00 | 0.00 | 0.00 | 0.00 | 0.00 | 0.00 | 0.00 | 0.00 | 0.00 | 8.92 | 2.14 | 0.00 |
| 222FO | 0.00 | 0.00 | 0.00 | 0.00 | 0.00 | 0.00 | 0.00 | 0.00 | 3.85 | 0.05 | 0.00 | 0.00 | 12.50 | 3.19 | 3.85 |
| 222FP | 0.00 | 0.00 | 0.00 | 1.54 | 2.31 | 0.00 | 0.00 | 0.00 | 0.00 | 0.05 | 0.00 | 0.00 | 12.50 | 3.19 | 3.85 |
| 222FQ | 0.00 | 0.00 | 0.00 | 0.00 | 3.85 | 0.00 | 0.00 | 0.00 | 0.00 | 0.05 | 0.00 | 0.00 | 12.50 | 3.19 | 3.85 |

FIG. 5-C1

| SAMPLE ID | Strain (°C) | A (°C) | Soft (°C) | CTE (°C) | D | ILP (°C) | LP (°C) | PLP (°C) | PDP | PR | SM (Mpsi) | YM (Mpsi) | SM (GPa) | YM (GPa) | SpM |
|---|---|---|---|---|---|---|---|---|---|---|---|---|---|---|---|
| 175AFM | 513 | 556 | 732 | 89.4 | | 980 | 970 | 965 | Devitrite | 0.208 | 4.36 | 10.55 | 30.061 | 72.74 | #DIV/0! |
| 175AFN | 524 | 566 | 744 | 89.4 | | 1000 | 1000 | 980 | Devitrite | 0.219 | 4.43 | 10.79 | 30.544 | 74.394 | #DIV/0! |
| 175AFO | 532 | 574 | 756 | 88.8 | | 1020 | 1010 | 1000 | Devitrite | 0.219 | 4.48 | 10.93 | 30.889 | 75.36 | #DIV/0! |
| 175AFP | 545 | 588 | 775 | 85.9 | | 1030 | 1020 | 1015 | Devitrite | 0.221 | 4.59 | 11.22 | 31.647 | 77.359 | #DIV/0! |
| 175AFQ | 554 | 598 | 781 | 87.9 | | 1060 | 1050 | 1040 | Devitrite | 0.221 | 4.6 | 11.24 | 31.716 | 77.497 | #DIV/0! |
| 175AFR | 569 | 612 | 798 | 83.9 | | 1125 | 1120 | 1110 | Devitrite | 0.222 | 4.64 | 11.33 | 31.992 | 78.118 | #DIV/0! |
| 175AFS | 539 | 582 | 763 | 87.3 | | 1055 | 1050 | 1030 | Devitrite | 0.229 | 4.55 | 11.19 | 31.371 | 77.152 | #DIV/0! |
| 175AFT | 548 | 591 | 772 | 86.8 | | 1020 | 1010 | 1005 | Devitrite | 0.225 | 4.59 | 11.26 | 31.647 | 77.635 | #DIV/0! |
| 175AFU | 545 | 588 | 769 | 86 | | 1030 | 1020 | 1010 | Devitrite | 0.225 | 4.59 | 11.25 | 31.647 | 77.566 | #DIV/0! |
| 175AFV | 535 | 578 | 754 | 94.3 | 2.749 | 1000 | 990 | 980 | Devitrite | | | | | | |
| 175AFW | 526 | 567 | 738 | 100 | 2.753 | 965 | 960 | 960 | Devitrite | | | | | | |
| 175AFX | 548 | 591 | 775 | 86.5 | 2.753 | 1030 | 1015 | 1010 | Devitrite | | | | | | |
| 175AFY | 549 | 591 | 775 | 87.2 | 2.759 | 1060 | 1050 | 1030 | Devitrite | | | | | | |
| 175AFZ | 552 | 594 | 774 | 89.7 | 2.765 | 1060 | 1050 | 1040 | Devitrite | | | | | | |
| 175AGA | 551 | 593 | 779 | 87.6 | 2.739 | 1030 | 1015 | 1000 | Devitrite | | | | | | |
| 175AGB | 550 | 594 | 780 | 84.3 | 2.72 | 1035 | 1020 | 1005 | Devitrite | | | | | | |
| 175AGC | 537 | 578 | 753 | 86.1 | 2.748 | 995 | 990 | 985 | Devitrite | | | | | | |
| 175AGD | 530 | 571 | 743 | 84.5 | 2.742 | 960 | 955 | 945 | Devitrite | | | | | | |
| 175ALW | 507 | 547 | 719 | 93.9 | 2.73 | 850 | 845 | 855 | Devitrite ? | 0.225 | 4.43 | 10.84 | 30.544 | 74.739 | 27.377 |
| 175ALX | 518 | 558 | 734 | 95.9 | 2.757 | 830 | 820 | 815 | Devitrite ? | 0.228 | 4.5 | 11.04 | 31.026 | 76.118 | 27.609 |
| 175ALY | 515 | 557 | 733 | 94.1 | 2.764 | 820 | 810 | 795 | Devitrite ? | 0.226 | 4.5 | 11.03 | 31.026 | 76.049 | 27.5142 |
| 175ALZ | 520 | 561 | 736 | 94.5 | 2.759 | 855 | 840 | 815 | Devitrite ? | 0.227 | 4.5 | 11.04 | 31.026 | 76.118 | 27.589 |
| 175AMA | 499 | 539 | 712 | 97 | 2.717 | 830 | 815 | 815 | Devitrite ? | 0.229 | 4.39 | 10.78 | 30.268 | 74.325 | 27.3557 |
| 175AMB | 498 | 539 | 709 | 98.6 | 2.718 | 825 | 825 | 795 | Devitrite ? | 0.224 | 4.4 | 10.76 | 30.337 | 74.188 | 27.2949 |
| 175AMR | 510 | 550 | 719 | 97.9 | 2.722 | 820 | 800 | 765 | Devitrite | | | | 0 | 0 | 0 |
| 175AMS | 515 | 555 | 721 | 96.3 | 2.734 | 820 | 815 | 800 | Devitrite | | | | 0 | 0 | 0 |
| 175AMT | 500 | 540 | 707 | 97.9 | 2.667 | 1105 | 1000 | 1015 | | | | | 0 | 0 | 0 |
| 175AMU | 517 | 558 | 731 | 95.8 | 2.714 | 810 | 800 | 775 | Devitrite | | | | 0 | 0 | 0 |
| 175AMV | 495 | 536 | 707 | 96.3 | 2.727 | 795 | 790 | 780 | Devitrite | | | | 0 | 0 | 0 |
| 175AMW | 466 | 505 | 673 | 93.4 | 2.718 | 940 | 935 | 815 | | | | | 0 | 0 | 0 |
| 175AMX | 453 | 491 | 660 | 89 | 2.698 | 1060 | 930 | 925 | | | | | 0 | 0 | 0 |
| 175AMY | 521 | 564 | 745 | 101.4 | 2.717 | 750 | 760 | 745 | Cristobalite | | | | 0 | 0 | 0 |
| 175AMZ | 511 | 552 | 723 | 96 | 2.733 | 810 | 800 | 795 | Devitrite | | | | 0 | 0 | 0 |

FIG. 5-C2

| SAMPLE ID | Strain (°C) | A (°C) | Soft (°C) | CTE (°C) | D | ILP (°C) | LP (°C) | PLP (°C) | PDP | PR | SM (Mpsi) | YM (Mpsi) | SM (GPa) | YM (GPa) | SpM |
|---|---|---|---|---|---|---|---|---|---|---|---|---|---|---|---|
| 175ARN | | | | | | 1015 | 1015 | 1000 | Diopside | | | | 0 | 0 | #DIV/0! |
| 175ARO | | | | | | 1030 | 1015 | 1005 | Diopside | | | | 0 | 0 | #DIV/0! |
| 175ARP | | | | | | 1025 | 1015 | 1010 | Diopside | | | | 0 | 0 | #DIV/0! |
| 175ARQ | | | | | | 1030 | 1025 | 1010 | Diopside | | | | 0 | 0 | #DIV/0! |
| 175ARR | | | | | | 1105 | 1075 | 1030 | Unknown | | | | 0 | 0 | #DIV/0! |
| 175ARS | | | | | | 1095 | 1065 | 1070 | Unknown | | | | 0 | 0 | #DIV/0! |
| 175ASD | 522 | 563 | 714 | 94.7 | 2.967 | | | | | | | | 0 | 0 | 0 |
| 175ASE | 524 | 565 | 754 | 95.2 | 3.057 | | | | | | | | 0 | 0 | 0 |
| 175ASF | 543 | 583 | 734 | 94.6 | 3.22 | | | | | | | | 0 | 0 | 0 |
| 175ASG | 519 | 559 | 730 | 107.3 | 3.244 | | | | | | | | 0 | 0 | 0 |
| 175ASH | 532 | 570 | 726 | 93.4 | 3.226 | | | | | | | | 0 | 0 | 0 |
| 175ASI | 531 | 568 | 708 | 92.4 | 3.231 | | | | | | | | 0 | 0 | 0 |
| 175ASJ | 524 | 564 | 731 | 100.7 | 3.417 | | | | | | | | | | |
| 175ATT | 400 | 439 | | 114.4 | 2.581 | 705 | 695 | 665 | Unknown | 0.218 | 4.32 | 10.54 | 29.785 | 72.671 | 28.156 |
| 175ATU | 464 | 502 | | 105.4 | 3.104 | 1280 | 1285 | 1290 | Unknown | 0.248 | 4.76 | 11.88 | 32.819 | 81.91 | 26.3884 |
| 175ATV | 482 | 522 | | 104.5 | 3.257 | >1300 | >1300 | >1300 | Unknown | 0.247 | 4.9 | 12.21 | 33.784 | 84.185 | 25.8474 |
| 175ATW | 495 | 533 | | 103.9 | 3.399 | >1325 | >1325 | >1325 | Unknown | 0.251 | 5.01 | 12.54 | 34.543 | 86.46 | 25.437 |
| 175ATX | 478 | 516 | | 103.1 | 3.264 | >1350 | >1350 | >1350 | Unknown | 0.251 | 4.87 | 12.19 | 33.577 | 84.047 | 25.7497 |
| 175ATY | 474 | 512 | | 102.1 | 3.265 | >1290 | >1290 | >1290 | Unknown | 0.254 | 4.95 | 12.41 | 34.129 | 85.564 | 26.2064 |
| 175ATZ | 481 | 518 | | 98.5 | 3.174 | 1280 | 1280 | 1280 | Unknown | 0.245 | 4.88 | 12.15 | 33.646 | 83.771 | 26.393 |
| 175AUA | 504 | 543 | | 89.6 | 3.252 | >1320 | >1320 | >1320 | Unknown | 0.253 | 4.98 | 12.49 | 34.336 | 86.116 | 26.4808 |
| 175AUB | 520 | 560 | | 94.2 | 3.363 | >1325 | >1325 | >1325 | Unknown | 0.253 | 5.04 | 12.62 | 34.75 | 87.012 | 25.8733 |
| 175AUC | 462 | 501 | 654.3 | 101.3 | 2.884 | <765 | 825 | 800 | Unknown | 0.226 | 4.81 | 11.8 | 33.164 | 81.358 | 28.2102 |
| 175AUD | 453 | 490 | 643.9 | 101.5 | 2.886 | 900 | 900 | 895 | Diopside | 0.234 | 4.79 | 11.83 | 33.026 | 81.565 | 28.2623 |
| 175AUE | 446 | 483 | 644.6 | 101.3 | 2.731 | 855 | 850 | <850 | Unknown | 0.222 | 4.77 | 11.65 | 32.888 | 80.324 | 29.4119 |
| 175AUF | 458 | 496 | 643.3 | 98.7 | 2.846 | 930 | 925 | 960 | Unknown | 0.226 | 4.85 | 11.89 | 33.44 | 81.979 | 28.8049 |
| 175AUG | 469 | 507 | 666.1 | 97.5 | 2.943 | 895 | 920 | 890 | Unknown | 0.228 | 4.9 | 12.02 | 33.784 | 82.875 | 28.16 |
| 175AUH | 484 | 522 | 688.8 | 95 | 3.136 | 995 | 1005 | 995 | Diopside | 0.233 | 4.97 | 12.26 | 34.267 | 84.53 | 26.9546 |
| 175AUI | 481 | 518 | 656.5 | 93 | 2.872 | 885 | 885 | 860 | Unknown | 0.223 | 4.93 | 12.06 | 33.991 | 83.151 | 28.9522 |
| 175AUJ | 469 | 506 | 652.8 | 95.9 | 2.947 | 845 | 860 | 840 | Unknown | 0.234 | 4.96 | 12.24 | 34.198 | 84.392 | 28.6365 |
| 175AUK | 471 | 506 | 648.7 | 95.5 | 2.949 | <835 | <835 | <835 | | 0.23 | 4.98 | 12.25 | 34.336 | 84.461 | 28.6405 |
| 175AUS | 458 | 496 | | 99.8 | 2.905 | 905 | 905 | 910 | Unknown | 0.231 | 4.8 | 11.82 | 33.095 | 81.496 | 28.0537 |

FIG. 5-C3

| SAMPLE ID | Strain (°C) | A (°C) | Soft (°C) | CTE (°C) | D | ILP (°C) | LP (°C) | PLP (°C) | PDP | PR | SM (Mpsi) | YM (Mpsi) | SM (GPa) | YM (GPa) | SpM |
|---|---|---|---|---|---|---|---|---|---|---|---|---|---|---|---|
| **175AUT** | 464 | 500 | | 99.9 | 3.021 | 1165 | 1170 | 1145 | $NaNd_9Si_6O_{26}$ | 0.241 | 4.79 | 11.88 | 33.026 | 81.91 | 27.1134 |
| **175AUU** | 460 | 497 | | 101.1 | 3.028 | 1195 | 1155 | 1160 | $NaNd_9Si_6O_{26}$ | 0.243 | 4.78 | 11.87 | 32.957 | 81.841 | 27.028 |
| **175AUV** | 478 | 516 | | 101.6 | 3.167 | 1285 | 1275 | 1280 | $NaNd_9Si_6O_{26}$ | 0.244 | 4.81 | 11.98 | 33.164 | 82.599 | 26.0812 |
| **175AUW** | 476 | 514 | | 98.7 | 3.17 | 1280 | 1265 | 1265 | $NaNd_9Si_6O_{26}$ | 0.248 | 4.87 | 12.16 | 33.577 | 83.84 | 26.448 |
| **175AUX** | 479 | 517 | | 102.3 | 3.182 | 1300 | 1280 | 1280 | $NaNd_9Si_6O_{26}$ | 0.247 | 4.9 | 12.21 | 33.784 | 84.185 | 26.4566 |
| **175AUY** | 471 | 508 | | 98.2 | 3.171 | 1220 | 1220 | 1220 | $NaNd_9Si_6O_{26}$ | 0.247 | 4.93 | 12.3 | 33.991 | 84.806 | 26.7441 |

FIG. 5-D

| | Strain | A | D | Appearance at Pour |
|---|---|---|---|---|
| **175AQA** | 573 | 615 | | Glass with few crystalline inclusions |
| **175AQB** | | | | Glass with few crystalline inclusions |
| **175AQC** | | | | Glass with few crystalline inclusions |
| **175AQD** | | | | Glass with few crystalline inclusions |
| **175AQE** | 573 | 615 | | Glass with few crystalline inclusions |
| **175AQF** | 579 | 621 | | Glass with few crystalline inclusions |
| **175AQG** | | | | Totally Devitrified |
| **175AQH** | 540 | 581 | | Glass with few crystalline inclusions |
| **175AQI** | | | | Totally Devitrified |
| **175AWP** | 475 | 513 | 2.945 | |
| **175AWQ** | 481 | 520 | 2.975 | |
| **175AWR** | 506 | 546 | 2.98 | |
| **175AWS** | 467 | 505 | 2.98 | |
| **175AWT** | 464 | 502 | 2.652 | |
| **175AWU** | 455 | 492 | 2.673 | |

Strain = Strainning Temperature
A = Annealing Temperature
SOFT = Softening Temperature
CTE = Coefficient of Thermal Expansion
D = Density
ILP = 24-hr Interval Liquidus Temperature
PDP = Primary Devitrification Phase
PR = Poisson's Ratio
YM = Young's Modulus
SM = Shear Modulus
SpM = Specific Modulus: E/density (GPa*cc/g)

FIG. 6

Fluorescent Color, Observed Glass Color(s), Reflected Color Coordinates, and Metamerism Index

| | Fluorescent Color Excitation Wavelength | | Absorptive Color Illumination | | Thickness | Reflected Color Coordinates SCE D65-10 | | | F02-10 (CWF) | | | A -10 | | | Metamerism Index Color Difference (CD) | | |
|---|---|---|---|---|---|---|---|---|---|---|---|---|---|---|---|---|---|
| Glass | 365nm | 405nm | Incandescent | Fluorescent | (mm) | L* | a* | b* | L* | a* | b* | L* | a* | b* | CD(D65-F02) | CD(F02-A10) | CD(D65-A10) |
| 175AUS | Red | Red | Clear | | 0.8 | 89.67 | 0.12 | 4.02 | 89.89 | 0.17 | 4.34 | 89.96 | 1.19 | 4.18 | 0.39 | 1.03 | 1.12 |
| 175AUT | - | - | Blue | Green | 0.8 | 60.20 | -17.03 | -5.01 | 58.05 | -22.29 | -7.07 | 57.92 | -16.63 | -7.88 | 6.04 | 5.72 | 3.69 |
| 175AUU | - | - | Blue | Green | 0.8 | 56.49 | -22.44 | -8.29 | 54.22 | -26.13 | -10.51 | 53.33 | -25.25 | -12.62 | 4.87 | 2.45 | 6.05 |
| 175AUV | - | - | Blue | Green | 0.8 | 53.77 | -18.34 | -3.61 | 52.29 | -24.42 | -4.38 | 51.47 | -19.74 | -5.96 | 6.30 | 5.01 | 3.57 |
| 175AUW | - | - | Blue | Green | 0.8 | 56.86 | -16.99 | -3.14 | 55.22 | -22.91 | -4.51 | 54.74 | -17.23 | -5.44 | 6.29 | 5.78 | 3.14 |
| 175AUX | - | - | Blue | Green | 0.8 | 54.04 | -17.77 | -2.92 | 52.63 | -24.09 | -3.57 | 51.85 | -18.87 | -5.04 | 6.51 | 5.48 | 3.24 |
| 175AUY | - | - | Blue | Green | 0.8 | 54.81 | -16.77 | -2.38 | 53.43 | -23.22 | -3.22 | 52.78 | -17.4 | -4.30 | 6.65 | 5.95 | 2.86 |
| 175AVL | - | - | Clear | Clear | 0.8 | 90.04 | -0.34 | 3.21 | 90.18 | -0.26 | 3.65 | 90.23 | 0.53 | 3.20 | 0.47 | 0.91 | 0.89 |
| 175AVM | - | - | Clear | Clear | 0.8 | 89.85 | -0.36 | 3.28 | 89.99 | -0.27 | 3.73 | 90.04 | 0.52 | 3.26 | 0.48 | 0.92 | 0.90 |
| 175AVN | - | - | Clear | Clear | 0.8 | 89.89 | -0.35 | 2.95 | 90.02 | -0.27 | 3.36 | 90.06 | 0.43 | 2.94 | 0.44 | 0.82 | 0.80 |
| 175AVO | - | - | Red | Green | 0.8 | 72.26 | -1.78 | 1.74 | 69.77 | -9.66 | -1.13 | 72.23 | 5.02 | 2.16 | 8.75 | 15.24 | 6.81 |
| 175AVP | - | - | Blue | Emerald | 0.8 | 65.20 | -18.46 | -8.46 | 62.35 | -21.43 | -11.96 | 62.46 | -18.2 | -12.62 | 5.40 | 3.30 | 4.99 |
| 175AVQ | - | - | Sky Blue | Sky Blue | 0.8 | 80.23 | -18.97 | -12.89 | 78.50 | -13.53 | -15.70 | 77.03 | -24.29 | -18.59 | 6.36 | 11.24 | 8.43 |
| 175AVR | - | - | Emerald | Sapphire | 0.8 | 74.03 | -24.36 | 15.28 | 73.47 | -11.58 | 7.54 | 72.28 | -20.78 | 9.89 | 14.95 | 9.57 | 6.70 |
| 175AVS | - | - | Yellow | Pink | 0.8 | 84.38 | -4.00 | 30.44 | 85.69 | 1.88 | 26.08 | 85.64 | 1.86 | 30.13 | 7.44 | 4.05 | 6.00 |
| 175AVT | - | - | Yellow | Pink | 0.8 | 84.25 | -3.86 | 30.37 | 85.57 | 2.07 | 25.90 | 85.53 | 1.94 | 30.09 | 7.54 | 4.19 | 5.95 |
| 175AVU | Blue | Lt Blue | Clear | Clear | 0.8 | 89.85 | -0.46 | 3.46 | 89.99 | -0.33 | 3.90 | 90.04 | 0.49 | 3.40 | 0.48 | 0.96 | 0.97 |
| 175AVV | Blue | Lt Blue | Clear | Clear | 0.8 | 89.41 | -0.85 | 5.55 | 89.65 | -0.68 | 6.28 | 89.70 | 0.61 | 5.44 | 0.79 | 1.54 | 1.49 |
| 175AVW | Green | Green | Clear | Clear | 0.8 | 89.33 | -0.54 | 4.73 | 89.52 | -0.39 | 5.34 | 89.59 | 0.77 | 4.65 | 0.66 | 1.35 | 1.34 |
| 175AVX | Green | - | Clear | Clear | 0.8 | 89.67 | -0.71 | 4.67 | 89.87 | -0.56 | 5.31 | 89.92 | 0.51 | 4.61 | 0.69 | 1.28 | 1.25 |
| 175AVY | Yellow | Red | Clear | Clear | 0.8 | 89.84 | -0.20 | 3.28 | 90.01 | -0.18 | 3.68 | 90.05 | 0.58 | 3.36 | 0.44 | 0.83 | 0.81 |
| 175AVZ | Orange | Red | Clear | Clear | 0.8 | 89.85 | -0.14 | 3.31 | 90.02 | -0.12 | 3.69 | 90.07 | 0.67 | 3.40 | 0.42 | 0.84 | 0.84 |
| 175AWA | Red | Red | Clear | Clear | 0.8 | 89.43 | -0.10 | 5.14 | 89.69 | 0.03 | 5.59 | 89.77 | 1.29 | 5.23 | 0.54 | 1.31 | 1.43 |
| 175AWB | Orange | Dim Orange | Clear | Clear | 0.8 | 89.00 | -0.91 | 10.12 | 89.45 | -0.45 | 9.94 | 89.58 | 1.03 | 10.70 | 0.67 | 1.67 | 2.11 |
| 175AWC | Red | Red | Clear | Clear | 0.8 | 89.45 | 0.00 | 4.44 | 89.68 | 0.08 | 4.78 | 89.76 | 1.2 | 4.56 | 0.42 | 1.14 | 1.25 |
| 175AWP | - | - | Yellow | Pink | 2.6 | 77.74 | -1.16 | 44.22 | 80.21 | 7.17 | 39.34 | 79.79 | 3.65 | 44.96 | 9.97 | 6.64 | 5.28 |
| 175AWQ | - | - | Yellow | Pink | 2.6 | 78.05 | -1.37 | 43.86 | 80.49 | 6.96 | 39.01 | 80.07 | 3.49 | 44.55 | 9.94 | 6.55 | 5.31 |
| 175AWR | - | - | Yellow | Pink | 2.6 | 77.76 | -1.24 | 44.52 | 80.23 | 7.04 | 39.84 | 79.81 | 3.65 | 45.20 | 9.83 | 6.36 | 5.35 |
| 175AWS | - | - | Yellow | Pink | 2.6 | 77.88 | -1.53 | 43.70 | 80.26 | 6.55 | 39.18 | 79.88 | 3.53 | 44.28 | 9.56 | 5.94 | 5.47 |
| 175AWT | - | - | Sky Blue | Sky Blue | 2.6 | 63.21 | -34.42 | -36.63 | 57.16 | -26.15 | -46.87 | 55.53 | -54.9 | -49.83 | 14.49 | 28.95 | 25.55 |
| 175AWU | - | - | Sky Blue | Sky Blue | 2.6 | 64.38 | -33.35 | -35.25 | 58.74 | -25.16 | -44.82 | 57.04 | -52.44 | -47.85 | 13.80 | 27.50 | 24.02 |
| 222EV | - | - | Yellow | Pink | 2.6 | 77.98 | -1.25 | 44.12 | 80.44 | 7.10 | 39.20 | 80.02 | 3.59 | 44.81 | 10.00 | 6.63 | 5.30 |
| 222EW | - | - | Emerald | Sapphire | 2.6 | 63.20 | -46.92 | -11.98 | 58.58 | -30.45 | -24.21 | 57.08 | -53.63 | -24.25 | 21.03 | 23.23 | 15.27 |
| 222EY | - | - | Green | Amethyst | 2.6 | 61.21 | -8.25 | 21.64 | 62.24 | 0.42 | 13.28 | 61.54 | -5.46 | 21.24 | 12.09 | 9.92 | 2.84 |
| 222EZ | - | - | Amethyst | Green | 2.6 | 43.38 | 2.01 | -3.11 | 42.73 | -11.80 | -1.21 | 43.52 | 1.87 | 1.41 | 13.96 | 13.94 | 4.52 |
| System96 | - | - | Clear | Clear | 2.6 | 89.79 | -0.22 | 2.98 | 89.96 | -0.22 | 3.49 | 89.97 | 0.52 | 2.98 | 0.54 | 0.90 | 0.76 |

HIGH RARE EARTH CONTENT SODA LIME COMPATIBLE GLASS

CROSS-REFERENCE TO RELATED APPLICATIONS

This application claims the benefit of priority under 35 U.S.C. § 371 of International Application No. PCT/US2020/022890, filed on Mar. 16, 2020, which claims the benefit of priority under 35 U.S.C. § 119 of U.S. Provisional Application Ser. No. 62/827,501 filed on Apr. 1, 2019, the content of which is relied upon and incorporated herein by reference in its entirety.

BACKGROUND

Rare earth (RE) oxides may be optically active and exhibit unique color combinations, metamerism, and/or fluorescence. Such properties may be desirable for art glass, high end glass containers (e.g., perfume bottles and spirit bottles), and for use in anticounterfeiting techniques and in devices such as amplifiers, lasers, and faraday rotators. However, glasses that contain RE oxides often are unstable and/or not workable. Adding rare earth oxides to conventional glass (e.g., conventional soda lime or borosilicate glass) may result in solubility issues, degradation of the glass, an increase in liquidus temperature of the glass, an increase in the annealing point of the glass, and/or a decrease in the coefficient of thermal expansion of the glass. Low amounts of RE oxides may be included in a glass composition but may result in weak colors and limited optical effect.

SUMMARY

Various glass compositions are described herein contain rare earth content (e.g., rare earth oxides, elements, and/or ions). For instance, the glass compositions may comprise $X_2O_3$, $R_2O$, and/or RO, wherein $X_2O_3$ includes rare earth content, $R_2O$ includes alkali content (e.g., alkali oxides, elements, and/or ions) and/or alkali-like content, and RO includes alkaline earth content and/or alkaline-like content.

A first example glass composition includes, in mol %: 58-90 $SiO_2$, 0-2.5 $Al_2O_3$, 2-25 $B_2O_3$, 1-25 $Li_2O$, 2-25 $Na_2O$, 0-25 $K_2O$, 0-5 MgO, 0-7 CaO, 0-5 SrO, 0-5 BaO, and 0-5 ZnO. The first example glass composition further includes 0.65-12 mol % of one or more $X_2O_3$, wherein the one or more $X_2O_3$ include one or more of the following: $Ce_2O_3$, $Pr_2O_3$, $Nd_2O_3$, $Eu_2O_3$, $Tb_2O_3$, $Dy_2O_3$, $Ho_2O_3$, $Er_2O_3$, $Tm_2O_3$, or $Yb_2O_3$. The first example glass composition further includes 10-30 mol % of one or more $R_2O$, wherein the one or more $R_2O$ include one or more of the following: $Li_2O$, $Na_2O$, $K_2O$, or $Cs_2O$. The first example glass composition further includes 0-7 mol % one or more RO, wherein the one or more RO include one or more of the following: MgO, CaO, SrO, BaO, or ZnO.

A second example glass composition includes, in mol %: 60-74 $SiO_2$, 0-7 $Al_2O_3$, 2-12 $B_2O_3$, 1-25 $Li_2O$, 2-25 $Na_2O$, 0-25 $K_2O$, 0-15 MgO, 0.75-15 CaO, 0-15 SrO, 0-15 BaO, 0-15 ZnO. The second example glass composition also includes, in mol %, 0.5-12 of one or more $X_2O_3$, wherein the one or more $X_2O_3$ include one or more of the following: $Ce_2O_3$, $Pr_2O_3$, $Nd_2O_3$, $Pm_2O_3$, $Sm_2O_3$, $Eu_2O_3$, $Tb_2O_3$, $Dy_2O_3$, $Ho_2O_3$, $Er_2O_3$, or $Tm_2O_3$. The second example glass composition further includes, in mol %, 10-30 one or more $R_2O$, wherein the one or more $R_2O$ include one or more of the following: $Li_2O$, $Na_2O$, $K_2O$, $Rb_2O$ or $Cs_2O$. The second example glass composition also includes, in mol %, 0-7 one or more RO, wherein the one or more RO include one or more of the following: MgO, CaO, SrO, BaO, or ZnO. In the second example glass composition, a difference between the mol % of the one or more $R_2O$ and the mol % of the one or more RO is greater than the mol % of the one or more $X_2O_3$.

A third example glass composition includes, in mol %: 58-90 $SiO_2$, 0-5.5 $Al_2O_3$, 2-25 $B_2O_3$, 1-25 $Li_2O$, 2-25 $Na_2O$, 0-25 $K_2O$, 0-5 MgO, 0-7 CaO, 0-5 SrO, 0-5 BaO, 0-5 ZnO. The third example glass composition also includes, in mol %, 0.6-7 one or more $X_2O_3$, wherein the one or more $X_2O_3$ include one or more of the following: $Ce_2O_3$, $Pr_2O_3$, $Nd_2O_3$, $Eu_2O_3$, $Tb_2O_3$, $Dy_2O_3$, $Ho_2O_3$, $Er_2O_3$, $Tm_2O_3$, or $Yb_2O_3$. The third example glass composition also includes, in mol %, 10-30 one or more $R_2O$, wherein the one or more $R_2O$ include one or more of the following: $Li_2O$, $Na_2O$, $K_2O$, or $Cs_2O$. The third example glass composition includes, in mol %, 0-7 one or more RO, wherein the one or more RO include one or more of the following: MgO, CaO, SrO, BaO, or ZnO. The third example glass composition further includes, in mol %, 0<0.1 one or more of the following: PbO, CdO, or $TeO_2$. The third example glass composition further includes one or more colorants, wherein the one or more colorants include one or more of the following: $Cr_2O_3$, $Fe_2O_3$, CoO, or NiO. In the third example glass composition, a mole percent of the one or more colorants is about 50% or less of a mole percent of the one or more $X_2O_3$.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 3A-3C show examples of rare earth content glass combined with soda lime glass.

Figure 1:
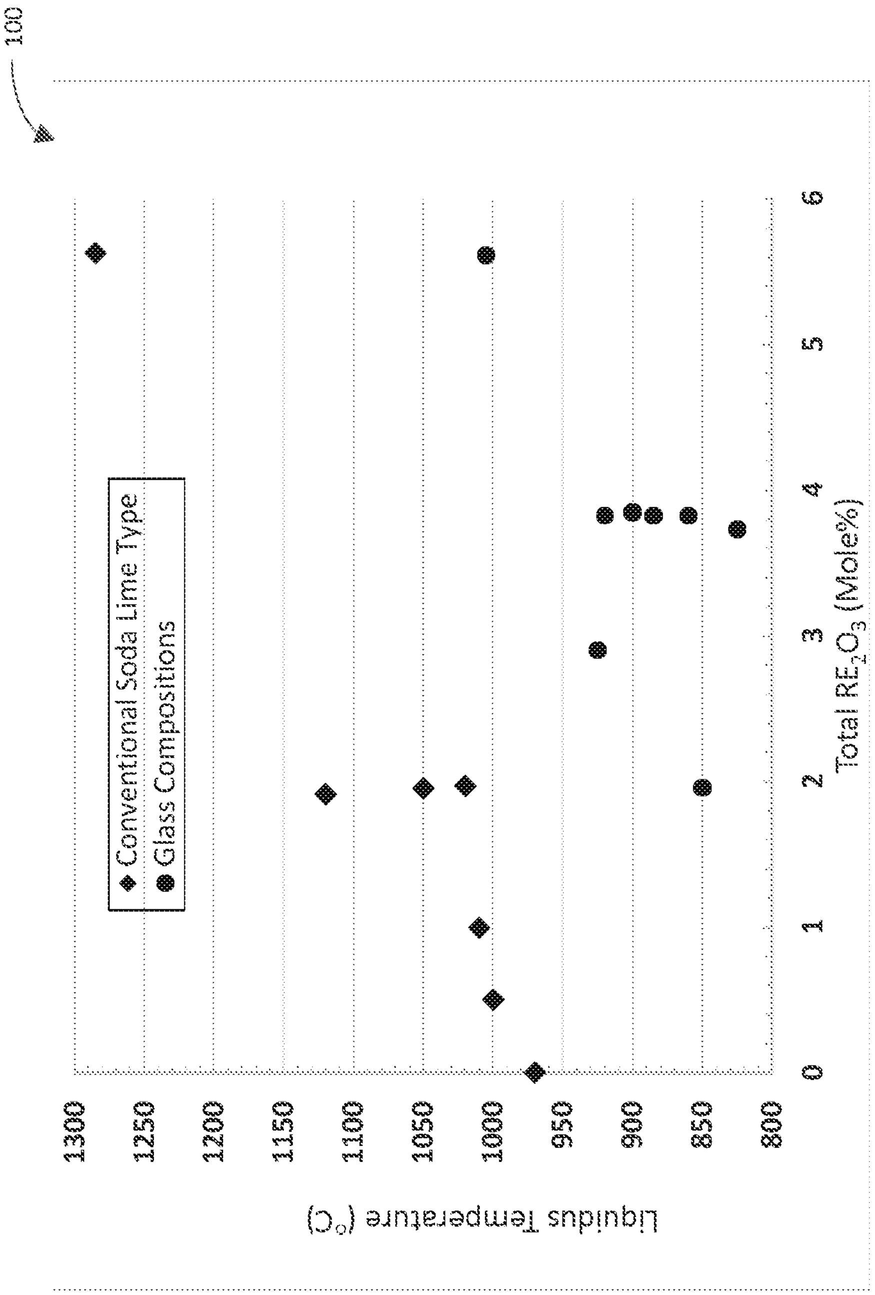
FIG. 1 depicts an example plot of liquidus temperature with respect to rare earth content.

FIGS. 4, 5-A1-5-A4, 5-B1-5-B4, 5-C1-5-C3, and 5-D depict tables showing compositions of soda lime glass containing rare earth content.

FIG. 6 depicts a table showing example compositions in accordance with embodiments.

FIGS. 7A-7F illustrate an example glass vase containing rare earth content in accordance with embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or property, but every embodiment may not necessarily include the particular feature, structure, or property. Moreover, such phrases are not necessarily referring to the same embodiment. Furthermore, when a particular feature, structure, or property is described in connection with an embodiment, it is submitted that it is within the knowledge of one skilled in the relevant art(s) to implement such feature, structure, or property in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

The term "rare earth containing glass" is used herein to refer to a glass that contains rare earth content. The term "rare earth content" is used herein to refer to any composition containing one or more rare earth oxides, ions, salts, and/or elements. The term "content" is used herein to refer to one or more oxides, ions, salts, and/or elements. The term "conventional glass" is used herein to refer to any glass that does not contain rare earth content. Examples of a conventional glass include but are not limited to soda lime glass, borosilicate glass, lead glass, aluminosilicate glass, fused silica glass, ninety-six percent silica glass and the like that does not include rare earth content.

The representation "$X_2O_3$" is used herein to refer to a molecular formula in which X is any element that has a $3^+$ charge and O is oxygen with a $2^-$ charge. For example, rare earth elements Sc, Y, La, Ce, Pr, Nd, Pm, Sm, Eu, Gd, Tb, Dy, Ho, Er, Tm, Yb, and Lu have $3^+$ charges. The representation "$R_2O$" is used herein to refer to a molecular formula in which R is any element that has a $1^+$ charge and O is oxygen with a $2^-$ charge. The representation "RO" is used herein to refer to a molecular formula in which R is any element that has a $1^+$ charge and O is oxygen with a $1^-$ charge.

The term "combining" may include adding, mixing, uniting, coalescing, mingling, inter-mingling, joining, fusing and/or working with two or more compositions and/or components. For instance, each composition may be a raw material, an intermediate material in a precursor step, or a component. For example, rare earth content may be combined with ingredients of conventional glass, may be combined with any precursors of conventional glass at any step of production, or may be combined with a product glass composition.

A "working point" of a glass composition is a temperature of the glass composition at which a viscosity of the glass composition is $10^4$ Poise. A "softening point" of a glass composition is a temperature at which a viscosity of the glass composition is $10^{7.6}$ Poise. An "annealing point" of a glass composition is a temperature at which the viscosity of the glass composition is $10^{13}$ Poise. A "straining point" of a glass composition is a temperature at which a viscosity of the glass composition is $10^{14.7}$ Poise. A "liquidus temperature" of a glass composition is a temperature above which the glass composition is homogeneously liquid and below which crystals will form. For instance, the liquidus temperature is the highest temperature at which devitrification occurs in the glass composition. A "CTE" of a glass composition refers to a coefficient of thermal expansion of the glass composition over a temperature range of from about 20° C. to about 300° C.

The term "colorant" is used herein to refer to any element, molecule, ion, oxide, dye, fluorophore, chromophore, and/or color-bearing group that gives rise to an observed color, for instance, in a visible or ultraviolet wavelength region. For example, the glass composition can include no chromophores or at least one chromophore selected from $V_2O_5$, $Cr_2O_3$, MnO, $Mn_2O_3$, $Fe_2O_3$, CoO, $CO_3O_4$, NiO, CuO, $Nb_2O_5$, $CeO_2$, $HO_2O_3$ and $Er_2O_3$.

As used herein, "multichroic" refers to a capability of a glass composition to exhibit a shift in color upon illumination with different light sources. As used herein, "metamerism" refers to a capability of a glass composition to exhibit a shift in color upon being illuminated with first and second illuminants. As used herein, the "color difference (CD)" shows the color difference between two different illuminants. The color difference (CD) between two different illuminants can be represented by Equation (1):

$$CD=\sqrt{(L^*_1-L^*_2)^2+(a^*_1-a^*_2)^2+(b^*_1-b^*_2)^2} \quad (1)$$

where L*i, a*i, b*i are the CIELAB color coordinates (i.e., as adopted by the International Commission on Illumination in 1976) under the first illuminant (e.g., a D-65 illuminant), and $L^*_2$, $a^*_2$, $b^*_2$ are the CIELAB color coordinates on the same sample under the second illuminant (e.g., an F-02 illuminant). The three coordinates represent the lightness of the color (L*=0 yields black, and L*=100 indicates diffuse white; specular white may be higher), its position between red/magenta and green (a*, negative values indicate green while positive values indicate magenta) and its position between yellow and blue (b*, negative values indicate blue, and positive values indicate yellow).

II. Example Embodiments

Example glass compositions described herein contain rare earth content (e.g., rare earth oxides, elements, and/or ions). Example glass compositions described herein may exhibit a multichroic property, which refers to a capability of a glass composition to exhibit a shift in color (a.k.a. color-change) upon illumination with different light sources (e.g., that include a spectral change and/or an intensity change). For example, color-changing and multichroic glass compositions described herein can be combined in various forms with other color-changing glasses, e.g., the glasses described in International Publication No. WO2015/077136 ("WO '136 reference"), published on May 28, 2015, claiming the benefit of U.S. Provisional Application No. 61/905,958, filed Nov. 19, 2013, and/or glasses described in International Publication No. WO2017/180811 ("WO '811 reference"), published on Oct. 19, 2017, claiming the benefit of U.S. Provisional Application No. 62/322,562, filed Apr. 14, 2016. The WO '136 reference, the WO '811 reference, U.S. Provisional Application No. 61/905,958, and U.S. Provisional Application No. 62/322,562 are incorporated herein by reference in their entireties.

Many of the example glass compositions described herein include soda lime glass for illustrative purposes and are not intended to be limiting. Accordingly, it will be recognized that the glass compositions need not necessarily include soda lime glass. For instance, the glass composition may include any suitable type of glass, including but not limited to a glass-ceramic, a polymer, a single crystal, and/or other glass (e.g., borate glass, phosphate glass, fluoride glass, tellurate glass, or aluminate glass).

Example glass compositions described herein have a variety of benefits as compared to conventional glasses. For instance, the example glass compositions include rare earth content, which may cause the glass compositions to exhibit any of a variety of optical effects, including but not limited to increased metamerism, color brilliancy, color vibrancy, and florescence. For instance, rare earth content may be added to conventional glass to achieve desired optical effects while maintaining certain properties of conventional glass for ease of handling and forming to a final product. Soda lime glass is one example component with which the rare earth content may be combined. Soda lime glass is common because it is relatively soft and typically does not require high temperatures or exotic materials for melting or forming. Also, a relatively large industry, art community, and infrastructure has been built around soda lime glass. Thus, it may be desirable to incorporate rare earth content into soda lime glass to obtain one or more of the benefits described above.

An example glass composition described herein includes from about 58 mol % to about 90 mol % of $SiO_2$, from about 0 to about 2.5 mol % of $Al_2O_3$, from about 2 mol % to about 25 mol % of $B_2O_3$, from about 1 mol % to about 25 mol % of $Li_2O$, from about 2 mol % to about 25 mol % of $Na_2O$, from about 0 to about 25 mol % of $K_2O$, from about 0 to about 5 mol % of MgO, from about 0 to about 7 mol % of CaO, from about 0 to about 5 mol % of SrO, from about 0 to about 5 mol % of BaO, and from about 0 to about 5 mol % of ZnO. In an example embodiment, the glass composition includes from about 0.65 mol % to about 12 mol % of one or more $X_2O_3$, wherein the one or more $X_2O_3$ include one or more of the following: $Ce_2O_3$, $Pr_2O_3$, $Nd_2O_3$, $Eu_2O_3$, $Tb_2O_3$, $Dy_2O_3$, $Ho_2O_3$, $Er_2O_3$, $Tm_2O_3$, or $Yb_2O_3$. In accordance with this embodiment, the glass composition includes from about 10 mol % to about 30 mol % of one or more $R_2O$, wherein the one or more $R_2O$ include one or more of the following: $Li_2O$, $Na_2O$, $K_2O$, or $Cs_2O$. In further accordance with this embodiment, the glass composition includes from about 0 to about 7 mol % one or more RO, wherein the one or more RO include one or more of the following: MgO, CaO, SrO, BaO, or ZnO.

An example glass composition described herein includes from about 60 mol % to about 74 mol % of $SiO_2$, from about 0 to about 7 mol % of $Al_2O_3$, from about 2 mol % to about 12 mol % of $B_2O_3$, from about 1 mol % to about 25 mol % of $Li_2O$, from about 2 mol % to about 25 mol % of $Na_2O$, from about 0 to about 25 mol % of $K_2O$, from about 0 to about 15 mol % of MgO, from about 0.75 mol % to about 15 mol % of CaO, from about 0 to about 15 mol % of SrO, from about 0 to about 15 mol % of BaO, and from about 0 to about 15 mol % of ZnO. In an example embodiment, the example glass composition includes from about 0.5 mol % to about 12 mol % of one or more $X_2O_3$, wherein the one or more $X_2O_3$ include one or more of the following: $Ce_2O_3$, $Pr_2O_3$, $Nd_2O_3$, $Pm_2O_3$, $Sm_2O_3$, $Eu_2O_3$, $Tb_2O_3$, $Dy_2O_3$, $Ho_2O_3$, $Er_2O_3$, or $Tm_2O_3$. In accordance with this embodiment, the glass composition includes from about 10 mol % to about 30 mol % of one or more $R_2O$, wherein the one or more $R_2O$ include one or more of the following: $Li_2O$, $Na_2O$, $K_2O$, $Rb_2O$, or $Cs_2O$. In further accordance with this embodiment, the glass composition includes from about 0 to about 7 mol % one or more RO, wherein the one or more RO include one or more of the following: MgO, CaO, SrO, BaO, or ZnO. In further accordance with this embodiment, a difference between the mol % of the one or more $R_2O$ and the mol % of the one or more RO is greater than the mol % of the one or more $X_2O_3$.

An example glass composition described herein includes from about 58 mol % to about 90 mol % of $SiO_2$, from about 0 to about 5.5 mol % of $Al_2O_3$, from about 2 mol % to about 25 mol % of $B_2O_3$, from about 1 mol % to about 25 mol % of $Li_2O$, from about 2 mol % to about 25 mol % of $Na_2O$, from about 0 to about 25 mol % of $K_2O$, from about 0 to about 5 mol % of MgO, from about 0% to about 7 mol % of CaO, from about 0 to about 5 mol % of SrO, from about 0 to about 5 mol % of BaO, and from about 0 to about 5 mol % of ZnO. In an example embodiment, the glass composition includes from about 0.6 mol % to about 7 mol % of one or more $X_2O_3$, wherein the one or more $X_2O_3$ include one or more of the following: $Ce_2O_3$, $Pr_2O_3$, $Nd_2O_3$, $Eu_2O_3$, $Tb_2O_3$, $Dy_2O_3$, $Ho_2O_3$, $Er_2O_3$, $Tm_2O_3$ or $Yb_2O_3$. In accordance with this embodiment, the glass composition includes from about 10 mol % to about 30 mol % of one or more $R_2O$, wherein the one or more $R_2O$ include one or more of the following: $Li_2O$, $Na_2O$, $K_2O$ or $Cs_2O$. In further accordance with this embodiment, the glass composition includes from about 0 to about 7 mol % one or more RO, wherein the one or more RO include one or more of the following: MgO, CaO, SrO, BaO, or ZnO. In further accordance with this embodiment, the glass composition includes from 0 to about <0.1 mol % of one or more of the following: PbO, CdO, or $TeO_2$. In further accordance with this embodiment, the glass composition includes one or more colorants, wherein the one or more colorants include one or more of the following: $Cr_2O_3$, $Fe_2O_3$, CoO, or NiO. In further accordance with this embodiment, a mole percent of the one or more colorants is about 50% or less of a mole percent of the one or more $X_2O_3$.

Each of the glass compositions described herein is combinable with one or more other glass compositions described herein and/or with one or more conventional glass compositions and/or with one or more non-glass compositions, the combinations of which are limited only by end-users' imaginations. For instance, end-users may be glass artists, container artists, manufacturers, or organizations wishing to adopt anticounterfeiting measures. A glass composition may be combinable with other compositions based on its stability and having a viscosity similar to the viscosities of the other compositions.

An example glass composition may have chemical or mechanical properties that are similar to, closely related to, or matched to those properties of other glass composition(s) when being combined with those composition(s). Combining glass compositions that have a solubility mismatch or chemical incompatibility may lead to multiple phases of solids and liquids in the resulting glass composition, which may further exacerbate mismatching any of a variety of other properties, such as viscosity, working point, softening point, annealing point, liquidus temperature, and/or CTE. For example, an end-user working with two different glass compositions may want the glass compositions to achieve respective softening points within a relatively narrow temperature range so that the two glass compositions can be sculpted easily to a final product. A softening point mismatch may substantially reduce the possibility of sculpting the glass compositions at the same temperature point. Thus, it may be desirable to have a glass composition with a softening that is within about ±50° C. of a softening of the glass with which the rare earth content is combined, a liquidus temperature of less than or equal to about 1100° C., an annealing temperature that is within about ±50° C. of an annealing temperature of a glass with which the rare earth content is combined, a CTE that is within about $\pm 10\times10^{-7}$/° C. of a CTE of the glass with which the rare earth content is combined, and/or a working point that is within about ±100° C. of a working point of the glass with which the rare earth content is combined.

An example glass composition described herein has a liquidus temperature of the glass composition of less than or equal to about 1050° C. For instance, FIG. 1 shows the effects of adding rare earth content to conventional soda lime glass (trend shown in diamonds). As shown in FIG. 1, the liquidus temperature of conventional soda lime glass is approximately 970° C. When rare earth content is added to the conventional soda lime glass, the liquidus temperature of the glass increases in direct correlation with the increasing rare earth content. In another example, adding just two mole percent of rare earth content increases the liquidus temperature by about 100° C., and adding 5 mole percent increases the liquidus temperature by about 300° C. The increase in the liquidous temperature that results from adding the rare earth content to the conventional soda lime glass may limit the temperature to which the molten glass can be cooled for sustained periods of time and may make the glass more prone to devitrification. A glass cannot be held below its liquidus temperature because crystals will start to grow after a period of time. The rate of crystal growth and amount of devitrification that takes place will depend on the composition and how far below the liquidus temperature the glass has been cooled. Once a glass is cooled below its glass transition temperature, the glass is a solid and crystal growth from devitrification can no longer occur.

The example glass compositions described herein may not exhibit the increased liquidous temperature that is characteristic of conventional soda lime glass when rare earth content is added. For instance, the example glass compositions described herein may allow for up to three times greater rare earth content than conventional soda lime glass while maintaining a liquidus temperature that is less than or equal to a liquidus temperature of the conventional soda lime glass. Maintaining a relatively low liquidus temperature for a glass composition enables better separation between the liquid and crystal phases of the glass composition. It also enables the molten glass to be cooled to lower temperatures to increase its viscosity high enough to be formed. The viscosity of a glass will increase with decreasing temperature. A lower liquidus temperature enables the viscosity of the glass to be high enough for sheet forming, glass blowing, slumping, pressing, and other forming operations. If the liquidus temperature is too high, the glass is too fluid to be worked or formed. In some embodiments, it may be desirable to keep the liquidus temperature close to the liquidus temperature of conventional glass.

As shown in FIG. 1, example glass compositions described herein may have a lower liquidus temperature than conventional soda lime glass for containing substantially higher amounts of rare earth (trend shown in circles). Keeping the liquidus temperature low allows for more rare earth content to be included in the glass composition. The inclusion of a relatively high amount of rare earth content in the glass allows for more intense optical effects. For example, adding two mole percent of rare earth content to provide an example glass composition described herein may provide a liquidus temperature that is about 100° C. less than the liquidus temperature of conventional soda lime glass. Even at six mole percent, the liquidus temperature of an example glass composition described herein is barely above the baseline liquidus temperature (i.e., approximately 970° C.) of conventional soda lime glass. Similarly, increasing the rare earth content to above six mole percent (e.g., 10, 15 or 20 mole percent) may have a similar effect of maintaining the liquidus temperature of the resulting glass to be within a relatively close range to the liquidus temperature of conventional soda lime glass and/or controlling an increase in the liquidus temperature of the resulting glass. In an example embodiment, the liquidus temperature of the glass composition is less than or equal to about 1100° C., is less than or equal to about 1050° C., less than or equal to 1000° C., less than or equal to 950° C., or less than or equal to 900° C.

Each of the example glass compositions described herein includes rare earth content. For example, the rare earth content in a glass composition may include one or more of the following elements: Sc, Y, La, Ce, Pr, Nd, Pm, Sm, Eu, Gd, Tb, Dy, Ho, Er, Tm, Yb, and/or Lu. In another example, the rare earth content may include one or more of the following ions: $Sc^{3+}$, $Y^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and/or $Lu^{3+}$. In another example, the rare earth content may include one or more of the following oxides: $Sc_2O_3$, $Y_2O_3$, $La_2O_3$, $Ce_2O_3$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and/or $Lu_2O_3$. It may be desirable to have an amalgamation of glass compositions, including any combinations of any conventional glasses with any combinations of rare earth containing glasses, including combinations of rare earth containing glasses with other combinations of rare earth containing glasses. For example, rare earth elements, oxides, and/or ions may be combined with precursors of conventional glasses, including soda lime glasses. Rare earth oxides may be combined with soda lime glasses to obtain desired features, including one or more of the optical features described herein. For instance, it may be desirable to include one or more of the following rare earth oxides: $Ce_2O_3$, $Pr_2O_3$, $Nd_2O_3$, $Pm_2O_3$, $Sm_2O_3$, $Eu_2O_3$, $Tb_2O_3$, $Dy_2O_3$, $Ho_2O_3$, $Er_2O_3$, and/or $Tm_2O_3$ to produce glasses that are visibly colored and/or fluoresce in the visible wavelength spectrum. In another instance, it may be desirable to include one or more of the following rare earth oxides: $Sc_2O_3$, $Y_2O_3$, $La_2O_3$, $Gd_2O_3$, $Yb_2O_3$, and/or $Lu_2O_3$ to produce colorless glasses free of any fluorescence properties in the visible or ultraviolet wavelength spectrum and/or may be useful for tuning the physical properties of a glass composition.

Example glass compositions described herein may incorporate any suitable amount of rare earth content. For instance, a relatively high amount of rare earth content may be included in a glass composition, while allowing for stability, enhanced optical effect, resistance to crystallization, increased metamerism, color saturation, and/or florescence, and/or pliability for three-dimensional forming. For instance, the glass composition may include from about >0.5 mol % to about 20 mol % of rare earth content. For example, the glass composition may include from about 0.5 mol %, from about 0.65 mol %, from about 0.7 mol %, from about 0.75 mol %, from about 1 mol %, from about 2 mol %, from about 3 mol %, from about 4 mol %, from about 5 mol %, from about 6 mol %, from about 7 mol %, from about 8 mol %, from about 10 mol %, or from about 12 mol % rare earth content. In another example, the glass composition may include to about 7 mol %, to about 10 mol %, to about 12 mol %, to about 15 mol %, to about 18 mol %, or to about 20 mol % rare earth content.

Figure 2:
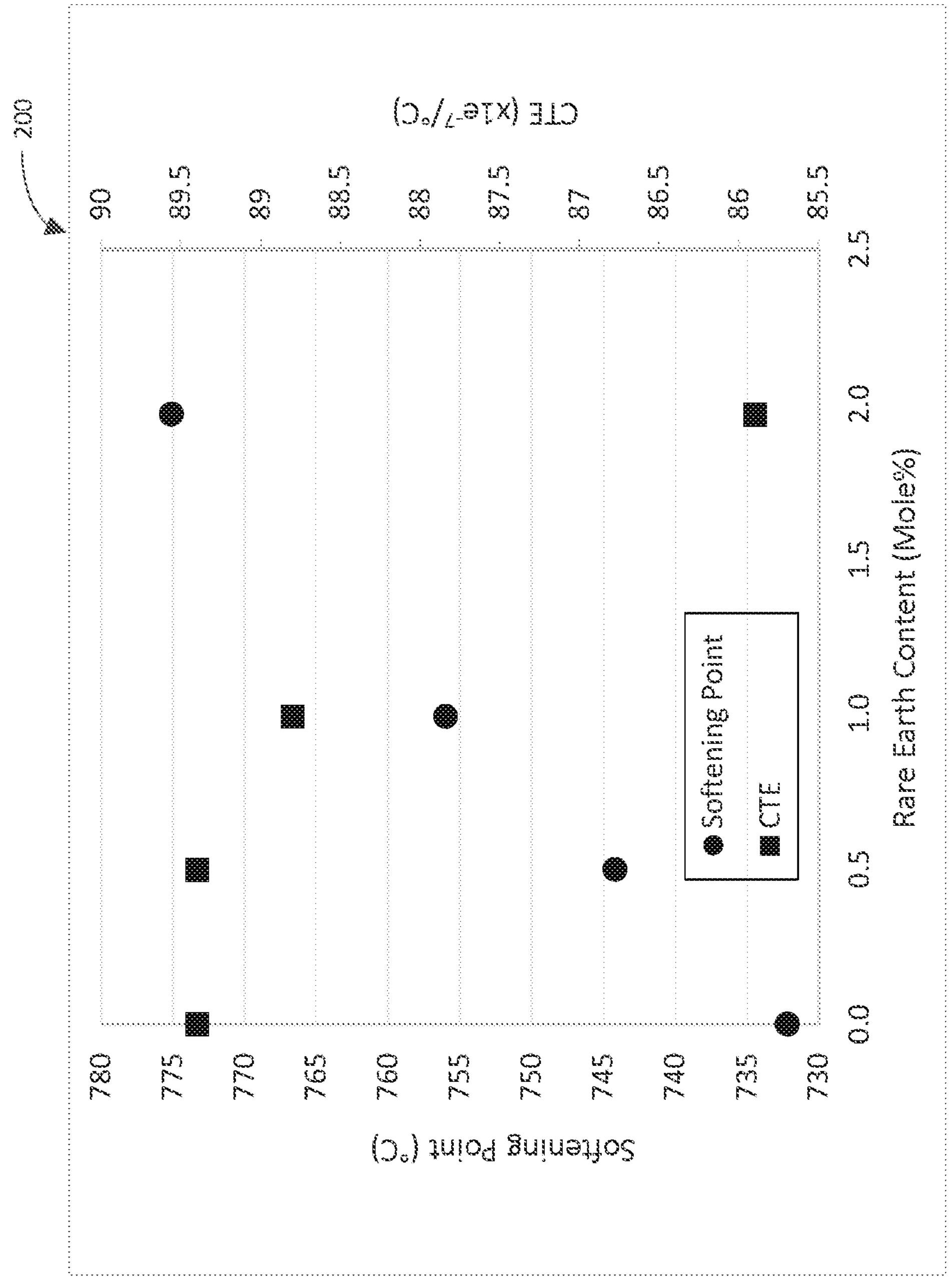
FIG. 2 depicts example plots of softening point and coefficient of thermal expansion (CTE) with respect to rare earth content.

FIG. 2 depicts example plots of softening point and CTE with respect to rare earth content. As shown in FIG. 2, the baseline softening point of conventional soda lime glass is approximately 730-735° C. In a conventional soda lime glass, adding 0.5 mole percent of rare earth oxide content may increase the softening point to 745° C., and adding 2 mole percent may increase the softening point to 775° C. Most glass artists use multiple glass compositions. For instance, a first glass composition may be clear, a second glass composition may have a first color, a third glass composition may have a second color, and so on. If the glass compositions are mismatched in viscosity, difficulties may arise when the artist tries to heat and reheat the glass compositions for sculpting. One glass composition may reach its softening point and working point while another glass composition is still too stiff to work. Thus, it is desirable for the glass compositions to be viscosity-matched.

The example glass compositions described herein may have a softening point that is maintained relatively close to the softening point of another composition such as other glass(es), with which the example glass compositions are being combined, or a non-glass composition, such as metal. Multiple combinable glasses having respective softening points within similar temperature ranges may allow for ease of treatment and handling, as they would in transition between solid and liquid phases at similar temperatures. For example, end users who routinely use soda lime glass can readily use the example glass compositions described herein with little (e.g., no) preparation or adjustment because the example glass compositions may be configured to behave similarly to other component(s) (e.g., conventional soda lime glass) while being worked.

The softening point of an example glass composition may be in a designated temperature range. For instance, the designated temperature range may be from about 630° C. to about 725° C., from about 660° C. to about 798° C., from about 650° C. to about 800° C., or from about 600° C. to about 750° C. In an example implementation, the glass composition may be combined with at least one other glass composition that has a softening point of less than or equal to 800° C., 750° C., or 700° C. The softening point of an example glass composition may be maintained close to the baseline level of conventional soda lime glass, allowing for treatment and handling of the glass in a manner similar to the conventional soda lime glass, though the example embodiments are not limited in this respect. In an example embodiment, an article includes an example glass composition described herein combined with one or more other glass compositions. In accordance with this embodiment, the softening points of the example glass composition and each of the other glass compositions are within about ±50° C., within about ±20° C., within about ±10° C., or within about ±5° C. of each other. It will be recognized that the example glass compositions described herein may have a softening point in a workable temperature range to allow for three-dimensional forming and/or molding of the glass compositions. In an example embodiment, an example glass composition described herein is combined with at least one other glass composition that has a softening point of less than about 800° C.

An example glass composition may have a softening point that is low enough to be able to melt onto a non-glass composition. For instance, the softening point may be low enough that it does not melt the non-glass composition with which the glass composition is being combined. For example, a glass composition that is fused to a surface of a metal coin or jewelry may have a softening point in a range of about 600 to about 700° C. to allow the fusion process without degrading the metal coin. In another example, the softening point of the glass composition may be about 650-750° C. In another example, the softening point may be about 700-800° C.

An example glass composition may have a CTE of from about $92\times10^{-7}$/° C. to about $100\times10^{-7}$/° C. This range of CTE is provided for illustrative purposes and is not intended to be limiting. For example, the CTE may be from about $88\times10^{-7}$/° C., $89\times10^{-7}$/° C., $90\times10^{-7}$/° C., $92\times10^{-7}$/° C., or $94\times10^{-7}$/° C. In another example, the CTE may be to about $98\times10^{-7}$/° C., $101\times10^{-7}$/° C., $102\times10^{-7}$/° C., or $105\times10^{-7}$/° C. An example glass composition may have a CTE that is within a designated range of a CTE of a conventional glass, such as soda lime glass, borosilicate glass, lead glass, aluminosilicate glass, fused silica glass, and the like. As shown in FIG. 2, the CTE of conventional soda lime glass is about $89\times10^{-7}$/° C. Adding 2 mole percent of rare earth content to conventional soda lime glass reduces the CTE by $3\times10^{-7}$/° C. Adding more rare earth content to conventional soda lime glass may further reduce the CTE beyond any practical use. In an example glass composition, it may be desirable to maintain the CTE of the glass composition relatively close to the CTE of conventional soda lime glass to allow for treatment and handling of the glass composition as one would treat or handle conventional soda lime glass. In an example embodiment, an article includes an example glass composition described herein combined with one or more other glass compositions. In accordance with this embodiment, the CTEs of the example glass composition and each of the other glass compositions are within about $\pm10\times10^{-7}$/° C., within about $\pm8\times10^{-7}$/° C., within about $\pm5\times10^{-7}$/° C., within about $\pm2\times10^{-7}$/° C., or within about $\pm1\times10^{-7}$/° C. of each other.

FIGS. 3A-3C show examples of rare earth content glass combined with soda lime glass, as viewed under cross polarized light, in accordance with embodiments. FIG. 3A shows a glass composition 301 with rare earth containing glass represented by a bright yellowish ring 302 at the rim combined with clear conventional soda lime glass 303. A fracture 304 at the interface between the rare earth containing glass 302 and the conventional soda lime glass 303 is introduced due to a CTE mismatch therebetween. For example, the difference between the CTEs of the compositions 302 and 303 causes the compositions 302 and 303 to contract at different rates as they cool from the annealing temperature, which causes stress and breakage 304 during the cooling process or upon subsequent mechanical damage. In an example embodiment, the CTE matching precision is dependent on the sizes of the compositions. For example, small articles or components can tolerate larger CTE mismatches than larger articles or components because the total strain is lower for the smaller compositions. The larger the articles or components, the more critical it becomes that the CTEs of all combinable glass compositions be within narrow ranges from each other.

FIG. 3B shows an example of a combined glass composition 305 in which a conventional soda lime glass 307 is fused with a rare earth containing glass composition 306. The two compositions have matching properties such as softening points, working points, and/or CTEs, which makes the final product free of defects. There is no stress in the combined composition 305, and the two compositions are held together without any cracks, breakage, or signs of devitrification at the interface.

FIG. 3C shows a glass composition 308 with conventional soda lime glass 309 combined with rare earth containing glass 310 that fractured due to a stress field that arises from fusing the dissimilar glasses 309 and 312. The lack of uniformity of color, indicated by bright 311 and dark surrounding glass 309 and 310, indicates mismatched compositions.

The working point of a glass composition described herein may be about $10^4$ Poise in a temperature range from about 900° C. to about 1100° C., from about 1000° C. to about 1200° C., from about 950° C. to about 1150° C., from about 900° C. to about 1000° C., from about 850° C. to about 1050° C., or from about 800° C. to about 1000° C. In an example embodiment, an article includes an example glass composition described herein combined with one or more other glass compositions. In accordance with this embodiment, the working points of the example glass composition and each of the other glass compositions are within about ±100° C., within about ±50° C., within about ±20° C., or within about ±10° C. of each other.

The annealing temperature of a glass composition described herein may be in a range from about 400° C. to about 600° C. This range of annealing temperature is provided for illustrative purposes and is not intended to be limiting. For example, the annealing temperature may be from about 450° C. or from about 500° C. In another example, the annealing temperature may be to about 625° C. or to about 650° C. Once the glass object is formed, an annealing step may relax stress that develops from the forming process. The annealing temperature may be specific to the size of the component. Mismatching compositions may result in a stress relaxation of one glass composition and not another, which may lead to fractures and deformities. For example, the composition with the lower annealing temperature may be deformed as stress is relieved in the composition that has the higher annealing temperature. Adding rare earth content tends to increase the annealing point while at the same time decrease the CTE. It may be desirable to add rare earth content to a glass composition while maintaining the annealing temperature close to that of conventional glass. In an example embodiment, an article includes an example glass composition described herein combined with one or more other glass compositions. In accordance with this embodiment, the annealing temperatures of the example glass composition and each of the other glass compositions are within about ±50° C., within about ±20° C., within about ±10° C., or within about ±5° C. of each other.

FIGS. 4 and 5 show tables of compositions of soda lime glass combined with rare earth content and the corresponding chemical and mechanical properties. FIG. 4 shows property mismatches. For instance, samples 175AQG and 175AQI are devitrified due to high rare earth content. Samples 175AQF and 175AQG, show the beginning of crystallization and include a mixture of glass and crystals. Increasing the rare earth content further impairs the process until, at about 10 mol %, the composition is fully crystallized (compositions 175AQG and 175AQI). The glass stability also deteriorates at high rare earth contents. Sample 175AQA with 7.42 mol % of total rare earth content did not fully melt after 6 hours at 1475° C. and contained alkaline earth and rare earth silicate crystals that did not dissolve. Samples 175AQG and 175AQI with greater than 10 mol % rare earth content had even more unmelted batch after 6 hours at 1475° C. and then completely devitrified when poured onto a cold steel table, indicating that the glass was no longer stable. FIG. 5 shows property matches. For example, at 2 mol % of rare earth content, sample 175AMV maintains a softening point (707° C.) and a CTE ($96.3\times10^{-7}$/° C.) close to the softening point and CTE of conventional soda lime glass and therefore is combinable with the conventional soda lime glass.

FIGS. 5-A1 through 5-A4 depict respective portions of a table, showing quantities of $SiO_2$, $Al_2O_3$, $B_2O_3$, $Li_2O$, $Na_2O$, $K_2O$, MgO, CaO, SrO, BaO, and ZnO for samples 175AFM-222FQ. FIGS. 5-B1 through 5-B4 depict other respective portions of the table, showing quantities of rare earth oxides $Y_2O_3$, $La_2O_3$, $Ce_2O_3$, $Pr_2O_3$, $Nd_2O_3$. $Sm_2O_3$. $Eu_2O_3$, $Tb_2O_3$ and $Ho_2O_3$ for samples 175AFM-222FQ. The rare earth oxides $Y_2O_3$, $La_2O_3$, $Gd_2O_3$, $Yb_2O_3$, and $Lu_2O_3$ do not impart any visible coloration or fluorescence and may or may not be included for adjusting the properties of the glass. FIGS. 5-B1 through 5-B4 also show relationships between quantities of $R_2O$ and quantities of RO for samples 175AFM-222FQ. $R_2O$ includes one or more of the following: $Li_2O$, $Na_2O$, $K_2O$, and/or $Cs_2O$. RO includes one or more of the following: MgO, CaO, SrO, BaO, and/or ZnO. In an example implementation, adjusting the ingredients of the glass composition may contribute to the stability of the glass composition. Thus, modifying the glass composition to include desired ranges of the ingredients may accommodate a relatively high amount of rare earth content without compromising the viscosity curve, introducing crystals, and/or resulting in devitrification. For example, substituting lithium and potassium for sodium, adding boron, and/or decreasing alkaline earth content and altering the alkali content may increase the pliability and stability of the glass composition.

The tables in FIGS. 5-C1 through 5-C3 and 5-D show the properties of some sample glass compositions. These properties can be used to determine the quality of matches to another composition. For example, sample compositions 175AWQ, 222FA, 222FB, 222FD, 222FE, 222FF, 222FM, 222FO, 222FP, and 222FQ in FIG. 5-B4 show chemical and/or property compatibility with articles such as commercial System 96 soda lime glass, and large blown vessels and sculptures. The sample articles comprising one or more of these compositions and System 96 soda lime glass were successfully made with the compositions disclosed herein. These sample glass compositions are also compatible with existing soda lime melting and forming equipment and are therefore easy to manufacture without additional capital equipment costs.

An example glass composition includes soda lime glass that includes from about 55 to about 75, from about 57 to about 78, from about 58 to about 80, from about 58 to about 85, from about 60 to about 75, from about 60 to about 80, from about 60 to about 90, from about 62 to about 90, from about 65 to about 85, from about 65 to about 90, or from about 60 to about 95 mole percent of $SiO_2$. The $SiO_2$ is known to have relatively low CTE, a high melting point, and a desirable working point and softening point. Accordingly, if the mole percent of $SiO_2$ in the glass composition is too high, the pliability of the glass composition can be diminished because higher mole percent of $SiO_2$ increase the difficulty of melting the glass, which, in turn, adversely impacts the formability of the glass. However, it should be understood that glass compositions that do not include silicon dioxide may also be used in some example embodiments. For example, phosphate glasses, borate glasses, and other non-silica glasses may be used in accordance with some example embodiments.

In an example embodiment, the glass composition includes from about 0 to about 10, from about 0 to about 8, from about 0 to about 7, from about 0 to about 6, from about 0 to about 5.5, from about 0 to about 5, from about 0 to about 4, from about 0 to about 3.5, from about 0 to about 3, or from about 0 to about 2 mole percent of $Al_2O_3$. $Al_2O_3$ increases the viscosity of the glass and lowers the CTE. Above about 10 mole percent of $Al_2O_3$, the liquidus temperature may increase and/or refractory rare earth aluminates with very high melting points can form, causing difficulties melting the glass to a clear homogeneous liquid. Thus, it may be preferable to have about 10 mol % or less, about 5.5 mol % or less, or about 2 mol % or less of $Al_2O_3$. For instance, the glass composition may comprise <1.75 mol % of $Al_2O_3$. For the glasses having the lowest softening and annealing points, it may be preferable to have less than 2 mol %, less than 1 mol %, or less than 0.5 mol % of $Al_2O_3$. However, it should be understood that the example glass compositions described herein are not limited in this respect. For instance, any one or more of the example glass systems described herein can include no $Al_2O_3$.

In an example embodiment, the glass composition includes about 2-25 mole percent of $B_2O_3$. The $B_2O_3$ may also help to soften the glass composition, increase the solubility of rare earth dopants, and make the glass easier to melt and form. To a lesser degree, the $B_2O_3$ may reduce the CTE of the glass composition. For example, the high $B_2O_3$ and high alkali content and lower alkaline earth oxides shown in sample 175AUJ of FIGS. 5A-5C comprises 3.8 mole percent of total rare earth content and a CTE of $95.9\times10^{-7}/°$ C., which matches most 96 expansion art glasses such as System 96®, Cristalica®, and Spruce Pine formulations. Sample 175AUJ has a liquidus temperature of 860° C., which is lower than most soda lime formulations, indicating that the glass is more stable against devitrification than soda lime glass itself. The glass is also relatively soft with a softening point of 653° C., making it more convenient to work with and making it compatible with existing soda lime infrastructure for bottle making, sheet forming, or art glass applications. $B_2O_3$ oxide can be increased at the expense of $SiO_2$ to further improve the stability of the glass and to soften the glass. If the $B_2O_3$ content is too high, then the glass can get too soft for soda lime compatibility, the glass durability can suffer, and the melt also becomes more corrosive to refractory crucibles making it costly and inefficient to produce. Therefore, in an example implementation, it may be desirable for the glass composition to comprise less than 25 mol %, less than 15 mol %, less than 10 mol %, less than 7 mol %, less than 5 mol % or less than 4 mol % of $B_2O_3$. In contrast, when the goal is to have the glass as soft as possible for fusing to metals like silver or gold, it may be desirable to have a relatively high $B_2O_3$ content to minimize the softening point for fusing. Therefore, in another example implementation, it may be desirable for the glass composition to comprise more than 4 mol %, more than 6 mol %, more than 8 mol %, more than 10 mol %, more than 14 mol %, or more than 18 mol % of $B_2O_3$.

In an example embodiment, the glass composition includes one or more alkali metal oxides. Examples of an alkali metal oxide include but are not limited to $Li_2O$, $Na_2O$, $K_2O$, $Rb_2O$ and $Cs_2O$. For instance, the alkali metal oxides may be present in the glass composition in 10-30 mole percent. It should be recognized that, in some embodiments, the total mole percent of alkali metal oxides in the glass composition may be less than or equal to about 30 mol %, 25 mol %, 20 mol %, or 15 mol %. In an aspect of this embodiment, the glass composition may include from about 2 mol %, from about 4 mol %, from about 6 mol %, or from about 8 mol % of $Na_2O$. In another aspect of this embodiment, the glass composition may include to about 22 mol %, to about 24 mol %, to about 25 mol %, or to about 28 mol % of $Na_2O$. $Na_2O$ can lower the viscosity of a glass to improve the meltability and the formability thereof. When the content of $Na_2O$ is too large, the CTE of the glass becomes too large, and the thermal shock resistance of the glass can be lowered. In yet another aspect of this embodiment, the mole percent of $Na_2O$ and the mole percent of each other alkali metal oxide in the glass composition may be the same. In still another aspect of this embodiment, the mole percent of $Na_2O$ and the mole percent of one or more of the other alkali metal oxides in the glass composition may be different.

In yet another aspect of the embodiment described above, the glass composition comprises about 1-25 mole percent of $Li_2O$ and/or about 2-25 mole percent $Na_2O$. In another aspect, the glass composition includes about 1-30, about 2-30, about 3-30, about 3-25, about 1-25, about 2-25, about 3-25, about 1-20, about 2-20, about 3-20 mole percent of $Li_2O$ and/or $Na_2O$. The inclusion of $Li_2O$ and/or $Na_2O$ affects the CTE of the glass composition. For example, adding rare earth oxide increases the viscosity of the glass (makes it "harder"), as evidenced by an increase in the straining point, annealing point, and/or softening point (shown in FIG. 2). For example, adding just 2 mole percent of rare earth content increases the softening point of conventional soda lime glass by more than 40° C. An end-user attempting to work a glass composition that includes conventional soda lime glass and a soda lime glass that includes 2 mol % rare earth oxide (e.g., composition 175AFP of FIG. 5-B1) may experience difficulties in shaping the glass. The glass composition behaves normally, but the inclusion of 2 mol % of rare earth oxide to the soda lime glass makes the glass composition significantly harder, stiffer and difficult to form. When the glass composition is cooled to room temperature, after the annealing process, the conventional soda lime glass may experience tension. The rare earth doped glass may be in compression because the rare earth content lowers the CTE by $4\times10^{-7}/°$ C. (FIG. 5-C1). This stress can then lead to breakage (shown in FIG. 3A). To address this issue, the alkali metal oxide content may be increased. For example, increasing alkali content may lower the annealing point, softening point, and/or working point, while increasing the CTE. In addition, a combination of alkali metal oxides may be used to tune the properties. The smaller the alkali ion, the more it will lower the CTE and annealing point of the glass. Thus, replacing $Na_2O$ with the equivalent molar amount of $Li_2O$ will lower the CTE and annealing point. For example, $Li_2O$ may lower the CTE more than $Na_2O$, and $Na_2O$ may lower the CTE more than $K_2O$, etc. Mixing alkali oxides leads to a further reduction of annealing point, softening point, and/or working point (known as the mixed alkali effect), so it may be beneficial to have a combination of alkali oxides both to keep the glass soft and to keep the liquidus temperature low.

In some example embodiments, the glass composition comprises $Li_2O$ in a range from about 1 mol % to about 25 mol %. In another example embodiment, the glass composition comprises $Li_2O$ in a range from about 0 mol %, from about 1 mol %, from about 2 mol %, from about 3 mol %, from about 5 mol %, or from about 6 mol %. In yet another example embodiment, the glass composition comprises $Li_2O$ in a range to about 7 mol %, to about 8 mol %, to about 10 mol % to about 14 mol %, to about 15 mol %, or to about 20 mol %. In some example embodiments, the glass composition comprises $K_2O$ in a range from about 1 mol % to about 25 mol %. In another example embodiment, the glass composition comprises $K_2O$ in a range from about 0 mol %, from about 1 mol %, from about 2 mol %, or from about 3 mol %. In yet another example embodiment, the glass composition comprises $K_2O$ in a range to about 7 mol %, to about 8 mol %, to about 10 mol %, to about 15 mol %, or to about 20 mol %. In some example embodiments, the glass composition comprises $Rb_2O$ in a range from about 0 mol % to about 25 mol %. In another example embodiment, the glass composition comprises $Rb_2O$ in a range from about 0 mol % to about 2 mol %, from about 0 mol % to about 5 mol %, from about 0 mol % to about 7 mol %, or from about 0 mol % to about 10 mol %. In an example embodiment, the glass composition comprises $Cs_2O$ in a range from about 0 mol % to about 2 mol %, from about 0 mol % to about 5 mol %, from about 0 mol % to about 8 mol %, from about 0 mol % to about 10 mol %, or from about 0 mol % to about 15 mol %. $Rb_2O$ and $Cs_2O$ are expensive ingredients and a way to control cost is to keep the amount(s) low. Additionally, $Cs_2O$ is not as effective as the other alkali oxides for reducing liquidus temperature.

In an example implementation, one or more alkali oxides (e.g., $Li_2O$, $Na_2O$, $K_2O$, $Rb_2O$, and/or $Cs_2O$) may enable ion exchange for modifying the mechanical stress and refractive index profiles of the glass composition. This allows for chemical strengthening and writing of waveguides via ion exchange that may provide security features to an article. For example, presenting alkali-containing glasses in a bath with silver ($AG^+$) ions may result in the $AG^+$ exchanging ions with the monovalent alkalis and, thereby, incorporating $AG^+$ ions into the glass composition. The incorporation of $AG^+$ ions may raise the refractive index of glasses containing $Li_2O$, $Na_2O$, $K_2O$ and/or $Rb_2O$ and may emit or otherwise fluoresce a green color when exposed to ultraviolet (UV) excitation light. The ion exchange can be patterned by masking portion(s) of the glass exposed to the bath containing $AG^+$ ions to create patterns of $AG^+$ waveguides or fluorescence. Alkali oxides do not add color to the glass and have a negligible effect on metamerism and fluorescence. In the case of glasses that serve as substrates for Si-based electronics, such as LCD displays, alkali ions, such as $Na^+$, can poison the Si transistors and degrade performance; consequently, for these applications, it can be desirable to have alkali-free compositions.

In an example embodiment, the glass composition may include from about 0 to about 15 mole percent alkaline earth metal oxide(s). In some embodiments, the alkaline earth metal oxide(s) may be selected from MgO, CaO, SrO, BaO, ZnO, or any combinations thereof. Such oxides can increase the meltability, durability, and stability of the glass. While ZnO is not an alkaline earth, it is a divalent oxide and serves a similar function as the above alkaline earth metal oxides; thus, ZnO can be added to the glass composition. The alkaline earth metal oxide(s) may be added as stabilizers that help prevent degradation of the glass composition upon exposure to environmental conditions. However, adding too much alkaline earth metal oxide to the glass composition may increase the liquidus temperature and decrease its formability. The solubility of rare earth oxide(s) in the example glass composition described herein may be increased by lowering the alkaline earth and/or silica content of the glass while increasing the $B_2O_3$ content. This leads to greater stability and lowers the propensity of the glass to devitrify. The CTE may be lowered by replacing some of the alkali with $Li_2O$, which also softens the glass. Keeping a combination of alkali and alkaline earth oxides also helps to soften the glass. The result is a stable high rare earth content composition that is soft, stable, easy to work, has brilliant colors, and is compatible with existing soda lime colors.

In an example embodiment, the glass composition comprises each alkaline earth metal oxide in a range from 0.0 mol % to about 15.0 mol %, from about 0.1 mol % to about 7.0 mol %, or from about 0.1 mol % to about 5.0 mol %. In an aspect of this embodiment, the glass composition comprises alkaline earth metal oxides in a range from about 0.5 mol % to about 7.0 mol %, for example from about 1 mol % to about 6.0 mol %. In an aspect of this embodiment, the glass composition may comprise alkaline earth metal oxides of about 5.0 mol %. The alkaline earth group helps to tune the CTE and viscosity of the glass composition, the efficacy of which is based on the size of the group's atomic radii. For example, the efficacy of the alkaline earth group to increase the CTE and working point is in the order of BaO>SrO>CaO>MgO. The smaller the alkaline earth, e.g., MgO and CaO, the smaller the increase in the CTE and the lower the working point. The effect of ZnO is approximately intermediate to CaO and MgO; however, ZnO raises the index of refraction more than MgO or CaO. In an example embodiment, the glass composition includes MgO in a range from about 0 mol % to about 8 mol %, from about 0 mol % to about 4 mol %, or from about 0.5 mol % to about 3 mol %. In an example embodiment, the glass composition includes CaO in a range from 0 mol % to about 12 mol %, from about 0.75 mol % to about 7 mol %, or from about 1 mol % to about 5 mol %. In an example embodiment, the glass composition includes SrO in a range from 0 mol % to about 8 mol %, from 0 mol % to about 4 mole %, or from 0 mol % to about 2 mol %. It should be known that the amount of SrO included in a glass composition may be comparable to the amount of MgO or CaO, but its inclusion in the glass composition may be kept to a relatively low amount because it is more expensive than MgO or CaO. In an example embodiment, the glass composition includes BaO in a range from 0 mol % to about 8 mol %, from 0 mol % to about 4 mol %, or from about 0.5 mol % to about 3 mol %. In an example embodiment, the glass composition includes ZnO in a range from 0 mol % to about 5 mol %, from 0 mol % to about 3 mol %, or from about 0.1 mol % to about 2 mol %.

In an example implementation, a ratio of a mole percent of the $R_2O$ in the glass composition to a mole percent of the RO in the glass composition is in a range from about 1 to about 300, from about 1 to about 200, from about 1.5 to about 200, from about 1 to about 150, from about 1.5 to about 150, from about 1.5 to about 100, from about 1 to about 75, or from about 1.5 to about 75. Adjusting the mole percent of the alkaline earth content to be less than the mole percent of the alkali content allows for the rare earth glass composition to have a liquidus temperature and viscosity to match that of soda lime type glasses. In another example implementation, the ratio of $R_2O$ to RO and/or the difference between $R_2O$ and RO is greater than 1.5. For example, the difference between $R_2O$ and RO may be represented by the inequality $2<(R_2O—RO)<1000$, $2.25<(R_2O—RO)<150$, or $2.5<(R_2O—RO)<10$. The difference of $R_2O—RO$ should increase with the amount of rare earth content and may be greater than the total rare earth oxide content, for example, greater than twice the total rare earth oxide content or greater than three times the total rare earth oxide content. In yet another implementation, the difference between the mole percent of $R_2O$ and the mole percent of RO is greater than the mole percent of $X_2O_3$ by twice-fold, by three-fold, by four-fold, by five-fold, or by ten-fold.

In an example embodiment, the glass composition comprises one or more colorants. Examples of a colorant include but are not limited to $Cr_2O_3$, $Fe_2O_3$, CoO, NiO, and any combination thereof. In accordance with this embodiment, a mole percent of the one or more colorants is about 50% or less, about 40% or less, about 35% or less, about 30% or less, about 25% or less, or about 15% or less of a mole percent of the one or more rare earth oxides that are included in the glass composition. It may be desirable to avoid masking or overwhelming the color or fluorescence of the rare earth color. In an example implementation, the content of the colorant(s) may be less than half of the total rare earth content, less than one fifth of the total rare earth content, or less than one tenth of the total rare earth content to avoid quenching of fluorescence or masking of the metamerism. In an aspect of this embodiment, the glass composition may include rare earth ions as colorants. For instance, the rare earth ions can be present as rare earth oxides. In one example implementation, ions of Er and/or Ce can be added to the glass composition as rare earth ion colorants.

In an example embodiment, the glass composition is substantially free of PbO, CdO, and/or $TeO_2$. In another example embodiment, the glass composition includes from about 0 to less than about 0.01, less than about 0.05, or less than about 0.1 mol percent of one or more PbO, CdO, or $TeO_2$. In yet another example embodiment, the PbO, CdO, and/or $TeO_2$ is present in an undetectable amount, i.e., not detectable by any measuring equipment. PbO, CdO, and $TeO_2$ have known harmful properties; PbO, CdO, and/or $TeO_2$ may therefore be excluded from the glass composition, presented in a trace amount, or reduced to a relatively low quantity in the glass composition.

In an example embodiment, the glass composition has a metamerism index (MI) of greater than 1 between a reference illuminant of D-65, F-02, or A-10 and a test illuminant of D-65, F-02, or A-10, wherein the reference illuminant and the test illuminant are different. Metamerism occurs when colors of a composition appear to be different under different lighting conditions. The metamerism index is a measure of the extent to which the color(s) appear to be different under the different lighting conditions. Typically, one type of illuminant, e.g., D-65 natural daylight, serves as a reference illuminant for a test illuminant, e.g., F-02 fluorescent or A-10 incandescent light. An MI of less than 0.5 indicates that the color(s) of the composition appear to be the same under the different lighting conditions. An MI in a range between 0.5 and 1 indicates uncertainty as to whether the color(s) of the composition will appear to be the same under the different lighting conditions. An MI of greater than 1 indicates that the color(s) of the composition appear to be different under the different lighting conditions.

FIG. 6 shows a table of fluorescent colors with corresponding excitation wavelengths, observed glass colors, and reflected color coordinates and metamerism indices for some sample glass compositions. In some example embodiments, the glass composition includes $Ho_2O_3$ with a metamerism index of greater than 1, as characterized by example compositions 175AVR, 175AVS, 175AVT, 175AWP, 175AWQ, 175AWR, and 175AWS shown in FIG. 6. For instance, the glass composition may include $Ho_2O_3$ in a range from about 0.5 mol % to about 5 mol %, which may result in the glass composition appearing golden yellow when observed in D-65 daylight illumination and vibrant pink when observed in F-02 fluorescent light illumination. For instance, if the glass composition includes less than about 0.5 mol % of $Ho_2O_3$, the resultant color of the glass composition may be difficult to notice with the unaided eye in path lengths less than a few millimeters. In addition, the metamerism or color shift, when changing illuminant, is barely noticeable in short pathlengths of less than a few millimeters. On the other hand, including greater than about 2 mol % $Ho_2O_3$ may reduce the stability of a typical soda lime glass composition. The example embodiments described herein may overcome these issues of rare earth glass compositions by having a substantially greater solubility match among the components in the glass composition, which allows for greater stability and allows for more rare earth content to be included in the glass composition. For example, 175AWQ with 3.85 mol % $Ho_2O_3$ is golden yellow in daylight (D-65), brilliant pink in fluorescent lighting (F-02), and has a metamerism index of 9.24 in a 2.6 mm thick sample. Increasing the amount of rare earth content may allow for virtually unlimited color combinations, including expansive ranges of color vibrancy, brilliancy, and metamerism. The embodiments described herein may enable end-users to have rare earth containing glasses in the entire palette of colors, tints, opals, and opaques for use in composites in accordance with desired specifications.

The metamerism index is derived from calculations of color difference (CD) measurements. The CD reported herein was obtained by measuring samples cut into 40×40 mm squares with a thickness of 2 mm and polished on both sides with cerium oxide polishing media. Color coordinates were then measured with a particular illuminant (e.g., F-02 illuminant) in a reflectance mode through the thickness of each sample on an X-Rite Color i7™ Benchtop Spectrophotometer with a white backing substrate situated behind each sample. The reported CD data was obtained using Equation (1). FIG. 6 indicates the corresponding color coordinates in L*, a*, b* space as a function of standard illumination conditions for the example compositions shown therein, as measured through the thickness of the sample (a 40×40 mm square). There are substantial shifts in the color coordinates between the full spectrum white light and fluorescent illuminants. For example, composition 175AWT (shown in FIG. 6) shows the F-02 to A-10 (i.e., "CD (F02-A10)" metamerism shift with the greatest color difference (CD) for this glass at 28.95.

In an example embodiment, the glass composition may comprise two or more fluorescent ions from about 0.5 mol % to about 20 mol %. In an example embodiment, the color of a fluorescent ion can emit one color when excited with light of a first wavelength (365 nm, for example); it can emit a second color when excited with light at a second wavelength (405 nm, for example); and it can emit a third color when excited with light at a third wavelength (488 nm, for example). For instance, the glass composition may include oxide(s) of Eu and oxide(s) of Tb as its fluorescent ions. As shown in FIG. 6, $Eu^{3+}$ doped glasses (compositions 175AVY, 175AVZ, 175AWA, and 175AWC) generally emit red when excited at a wavelength of 405 nm, and $Tb^{3+}$ doped glasses (compositions 175AVW, 175AVX, 175AVY, and 175AVZ) generally emit green when excited at a wavelength of 365 nm. However, when Eu oxides and Tb oxides are combined in a glass composition, the glass composition can emit light that is red, green, orange, yellow, or any combination of those colors upon being excited at a 365 nm wavelength, with the exact color depending on the proportional mixture of $Eu^{3+}$ and $Tb^{3+}$ ions in the glass. However, when the glass is excited with light at a 405 nm wavelength, only the $Eu^{3+}$ is excited and red light is emitted; and when the glass is excited with a 488 nm wavelength, only the $Tb^{3+}$ is excited and green light is emitted when the $Eu^{3+}$ mole percent is sufficiently low to prevent energy transfer from $Tb^{3+}$ to $Eu^{3+}$. Accordingly, the glass composition can be configured to emit three distinct colors depending on the wavelength of the light used to excite the glass composition. If the glass is melted in slightly reducing conditions, some or all of the $Eu^{3+}$ can be reduced to $Eu^{2+}$, which emits blue light when excited at wavelengths less than 400 nm. Such a glass co-doped with $Tb^{3+}$ will emit white ($Eu^{2+}$ $Eu^{3+}$, and $Tb^{3+}$ emission) light when excited at about 365 nm, purple ($Eu^{2+}$ and $Eu^{3+}$ emission) when excited at about 394 nm, blue ($Eu^{2+}$ emission, only) when excited at about 310 or about 330 nm, aqua ($Eu^{2+}$ and $Tb^{3+}$ emission) when excited at about 342 nm, green ($Tb^{3+}$ emission only) when excited at about 484 nm, and red ($Eu^{3+}$ emission only) when excited at about 464 nm.

Figure 7A:
Figure 7B:
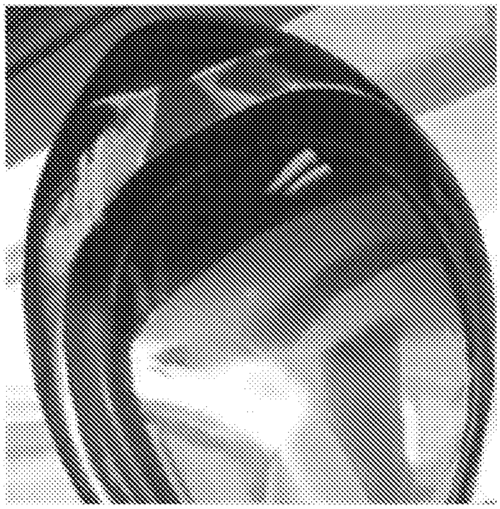
Figure 7C:
Figure 7D:
Figure 7E:
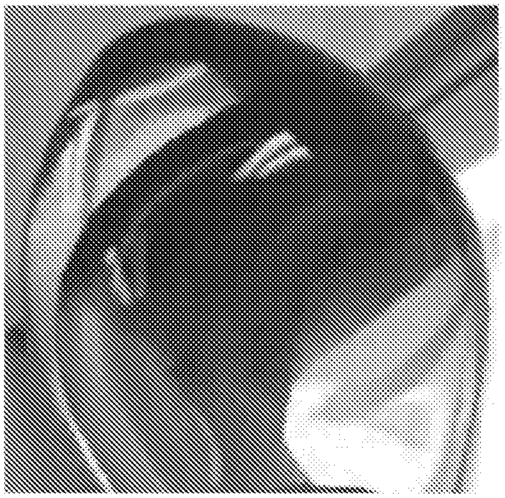
Figure 7F:
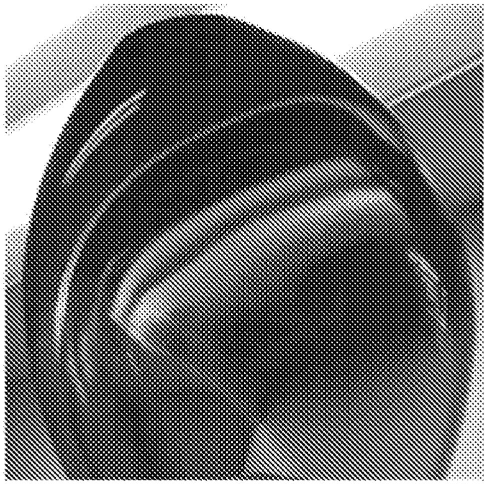

FIGS. 7A-7F illustrate an example glass vase containing rare earth content (comprising compositions 222FA, 222FC, and System 96 soda lime) in accordance with an embodiment. For instance, FIGS. 7A-7F show a metamerism of the glass vase in two standard illumination conditions and in several perspectives. FIG. 7A shows the glass vase exhibiting a combination of colorations and brightness when exposed to F-02 fluorescent light. FIGS. 7B and 7C show that when the same glass vase is turned at different angles in the presence of F-02 illumination, the color coordinates, pattern, and brightness transform to different color coordinates, pattern, and brightness. FIGS. 7D and 7E show that when the same glass vase is exposed to D-65 natural daylight illumination, different patterns and colors are seen. FIG. 7F shows that when the glass vase is brought back to F-02 illumination, but at a slightly different angle, the color pattern is deeper and more vibrant. Thus, it can be seen that if the same glass vase is exposed to a different type of illumination, such as an A-10 incandescent light, different colors and patterns may emerge. Accordingly, substantial shifts in the color coordinates, patterns, and brightness may be seen among the full spectrum of illuminants.

In addition to being used as aesthetic embellishments, the glasses described herein may be used in bottles and containers for goods and as anticounterfeiting measures. For example, perfumes, colognes, liqueurs, medicines, and electronics are frequently counterfeited; thus, the containers for these goods can be made from color-changing glasses described herein to facilitate detection of such counterfeiting. For instance, an example glass can be formed to have a first customized color in broad spectrum white light and a second customized color in fluorescent light, or the glass can be formed to fluoresce customized colors by using different fluorescent ions. In this way it can be easy to detect whether a good is counterfeit by simply observing the color of the glass in different sources of white light. To meet these various uses, example glasses described herein may be formed into articles such as bottles and glass sheets by any suitable glass forming method. For example, color-changing glass bottles may be made in numerous shapes and sizes by glass forming methods including, for example, blow molding, punch molding, punch and blow molding, and other suitable molding processes. Color-changing glasses according to some example embodiments may be formed into glass sheets that may be applied, for example, to electronics by methods such as, for example, floating or fusion drawing as disclosed in U.S. Pat. Nos. 3,338,696 and 3,682,609, which are incorporated herein by reference in their entireties.

In some example embodiments, the example glasses disclosed herein can be subjected to physical and/or chemical strengthening. For example, the glasses can be tempered by heat treatments or strengthened by ion exchange. In an ion-exchange process, an example glass may be exposed to an alkali ion containing solution, such as, for example, $KNO_3$ or $NaNO_3$. Upon exposure to the alkali ion containing solution, smaller alkali ions in the glass, such as, for example, Li and Na ions, are exchanged with larger ions, such as, for example, Na and K. This ion exchange reinforces the glass matrix and can strengthen the glass. Suitable ion exchange methods are disclosed in U.S. Pat. No. 5,674,790, which is incorporated herein by reference in its entirety. In addition to strengthening the glasses, the strengthening process can make the glass compositions frangible so that if someone tampers with the glass, it will shatter. In anti-counterfeiting systems, the frangibility of the glass may be a beneficial anti-tampering element.

III. Example Preparation Techniques

Some example glass compositions disclosed herein were prepared by combining the ingredients disclosed herein. The batches were then loaded in a platinum crucible, melted for 5 hours at 1325° C., and then poured into a bucket of water to make a cullet. The cullet was then crushed and re-melted for 6 hours at 1475° C. to homogenize the glass. The melts were then poured onto a steel table and annealed at 550° C. for 2 hours before cooling to room temperature. The resulting glass patties were cut into glass samples, which were then polished for purposes of color determinations and color coordinate measurements. In particular, the glass samples were polished to smooth their exterior surfaces, thus improving optical quality and reducing scattering of light passing through the thickness of the samples during color coordinate measurements. As understood by those with ordinary skill in the field of the disclosure, polishing times and conditions were varied based on the size of the samples for purposes of making color determinations and color coordinate measurements.

Some example glass compositions disclosed herein were prepared by combining the ingredients disclosed herein, loading them in a platinum crucible, and melting for 6 hours at 1475° C. The melts were then poured onto a steel table, and then annealed at 530° C. for 2 hours before cooling to room temperature. The resulting glass patties were cut into glass samples, which were then polished for purposes of color determinations. In particular, the glass samples were polished to smooth their exterior surfaces, thus improving optical quality. As understood by those with ordinary skill in the field of the disclosure, polishing times and conditions were varied based on the size of the samples for purposes of making color determinations.

IV. Further Discussion of Some Example Embodiments

A first example glass composition comprises, in mol %: 58-90 $SiO_2$, 0-2.5 $Al_2O_3$, 2-25 $B_2O_3$, 1-25 $Li_2O$, 2-25 $Na_2O$, 0-25 $K_2O$, 0-5 MgO, 0-7 CaO, 0-5 SrO, 0-5 BaO, and 0-5 ZnO. The first example glass composition further comprises 0.65-12 mol % of one or more $X_2O_3$, wherein the one or more $X_2O_3$ include one or more of the following: $Ce_2O_3$, $Pr_2O_3$, $Nd_2O_3$, $Eu_2O_3$, $Tb_2O_3$, $Dy_2O_3$, $Ho_2O_3$, $Er_2O_3$, $Tm_2O_3$, or $Yb_2O_3$. The first example glass composition further comprises 10-30 mol % of one or more $R_2O$, wherein the one or more $R_2O$ include one or more of the following: $Li_2O$, $Na_2O$, $K_2O$, or $Cs_2O$. The first example glass composition further comprises 0-7 mol % of one or more RO, wherein the one or more RO include one or more of the following: MgO, CaO, SrO, BaO, or ZnO.

In a first aspect of the first example glass composition, the glass composition comprises, in mol %: 62-90 $SiO_2$; 0<0.1 one or more of the following: PbO, CdO, or $TeO_2$; and a colorant selected from the group consisting of $Cr_2O_3$, $Fe_2O_3$, CoO, NiO, and combinations thereof. In accordance with the first aspect of the first example glass composition, a mole percent of the colorant is about 50% or less of a mole percent of the one or more rare earth oxides.

In a second aspect of the first example glass composition, a liquidus temperature of the first example glass composition is less than or equal to about 1050° C. The second aspect of the first example glass composition may be implemented in combination with the first aspect of the first example glass composition, though the example embodiments are not limited in this respect.

In a third aspect of the first example glass composition, a softening point of the first example glass composition is in a range from about 630° C. to about 725° C. The third aspect of the first example glass composition may be implemented in combination with the first and/or second aspect of the first example glass composition, though the example embodiments are not limited in this respect.

In a fourth aspect of the first example glass composition, a working point of the first example glass composition is about $10^4$ Poise in a temperature range from about 900° C. to about 1100° C. The fourth aspect of the first example glass composition may be implemented in combination with the first, second, and/or third aspect of the first example glass composition, though the example embodiments are not limited in this respect.

In a fifth aspect of the first example glass composition, a CTE of the first example glass composition is in a range from about $92\times10^{-7}$/° C. to about $100\times10^{-7}$/° C. The fifth aspect of the first example glass composition may be implemented in combination with the first, second, third, and/or fourth aspect of the first example glass composition, though the example embodiments are not limited in this respect.

In a sixth aspect of the first example glass composition, a ratio of a mole percent of the one or more $R_2O$ to a mole percent of the one or more RO is in a range from 1.5 to 150. The sixth aspect of the first example glass composition may be implemented in combination with the first, second, third, fourth, and/or fifth aspect of the first example glass composition, though the example embodiments are not limited in this respect.

In a seventh aspect of the first example glass composition, a metamerism index of the first example glass composition is greater than 1 between a reference illuminant that is one of D-65, F-02, or A-10 and a test illuminant that is one of D-65, F-02, or A-10. In accordance with the seventh aspect of the first example glass composition, the reference illuminant and the test illuminant are different. The seventh aspect of the first example glass composition may be implemented in combination with the first, second, third, fourth, fifth, and/or sixth aspect of the first example glass composition, though the example embodiments are not limited in this respect.

In an eighth aspect, an article comprises the first example glass composition combined with at least one other glass composition that has a softening point of less than about 800° C. The eighth aspect may be implemented in combination with the first, second, third, fourth, fifth, sixth, and/or seventh aspect of the first example glass composition, though the example embodiments are not limited in this respect.

In a ninth aspect of the first example glass composition, a method of making the first example glass composition comprises adjusting a liquidus temperature of the first example glass composition to less than or equal to about 1100° C.; causing the first example glass composition to have an annealing temperature in a range from about 400° C. to about 600° C.; causing the first example glass composition to have a softening point in a range from about 600° C. to about 800° C.; causing the first example glass composition to have a working point in a range from about 800° C. to about 1100° C.; and causing the first example glass composition to have a CTE that is in a range from about $90\times10^{-7}$/° C. to about $100\times10^{-7}$/° C. The ninth aspect of the first example glass composition may be implemented in combination with the first, second, third, fourth, fifth, sixth, seventh, and/or eight aspect of the first example glass composition, though the example embodiments are not limited in this respect.

A second example glass composition comprises, in mol %: 60-74 $SiO_2$, 0-7 $Al_2O_3$, 2-12 $B_2O_3$, 1-25 $Li_2O$, 2-25 $Na_2O$, 0-25 $K_2O$, 0-15 MgO, 0.75-15 CaO, 0-15 SrO, 0-15 BaO, and 0-15 ZnO. The second example glass composition further comprises 0.5-12 mol % of one or more $X_2O_3$, wherein the one or more $X_2O_3$ include one or more of the following: $Ce_2O_3$, $Pr_2O_3$, $Nd_2O_3$, $Pm_2O_3$, $Sm_2O_3$, $Eu_2O_3$, $Tb_2O_3$, $Dy_2O_3$, $Ho_2O_3$, $Er_2O_3$, or $Tm_2O_3$. The second example glass composition further comprises 10-30 mol % of one or more $R_2O$, wherein the one or more $R_2O$ include one or more of the following: $Li_2O$, $Na_2O$, $K_2O$, $Rb_2O$ or $Cs_2O$. The second example glass composition further comprises 0-7 mol % of one or more RO, wherein the one or more RO include one or more of the following: MgO, CaO, SrO, BaO, or ZnO. The second example glass composition further comprises a difference between the mol % of the one or more $R_2O$ and the mol % of the one or more RO is greater than the mol % of the one or more $X_2O_3$.

In a first aspect of the second example glass composition, a softening point of the glass composition is in a range from about 630° C. to about 725° C.

In a second aspect of the second example glass composition, a liquidus temperature of the second example glass composition is less than or equal to about 1050° C. The second aspect of the second example glass composition may be implemented in combination with the first aspect of the second example glass composition, though the example embodiments are not limited in this respect.

In a third aspect of the second example glass composition, a working point of the second example glass composition is about $10^4$ Poise in a temperature range from about 900° C. to about 1100° C. The third aspect of the second example glass composition may be implemented in combination with the first and/or second aspect of the second example glass composition, though the example embodiments are not limited in this respect.

In a fourth aspect of the second example glass composition, a CTE of the second example glass composition is in a range from about $92\times10^{-7}$/° C. to about $100\times10^{-7}$/° C. The fourth aspect of the second example glass composition may be implemented in combination with the first, second, and/or third aspect of the second example glass composition, though the example embodiments are not limited in this respect.

A third example glass composition comprises in mol %: 58-90 $SiO_2$, 0-5.5 $Al_2O_3$, 2-25 $B_2O_3$, 1-25 $Li_2O$, 2-25 $Na_2O$, 0-25 $K_2O$, 0-5 MgO, 0-7 CaO, 0-5 SrO, 0-5 BaO, and 0-5 ZnO. The third example glass composition further comprises 0.6-7 mol % of one or more $X_2O_3$, the one or more $X_2O_3$ include one or more of the following: $Ce_2O_3$, $Pr_2O_3$, $Nd_2O_3$, $Eu_2O_3$, $Tb_2O_3$, $Dy_2O_3$, $Ho_2O_3$, $Er_2O_3$, $Tm_2O_3$, or $Yb_2O_3$. The third example glass composition further comprises 10-30 mol % of one or more $R_2O$, the one or more $R_2O$ include one or more of the following: $Li_2O$, $Na_2O$, $K_2O$, or $Cs_2O$. The third example glass composition further comprises 0-7 mol % of one or more RO, wherein the one or more RO include one or more of the following: MgO, CaO, SrO, BaO, or ZnO. The third example glass composition further comprises, in mol %, 0<0.1 of one or more of the following: PbO, CdO, or $TeO_2$. The third example glass composition further comprises one or more colorants, wherein the one or more colorants include one or more of the following: $Cr_2O_3$, $Fe_2O_3$, CoO, or NiO. A mole percent of the one or more colorants is about 50% or less of a mole percent of the one or more $X_2O_3$.

In a first aspect of the third example glass composition, a softening point of the third example glass composition is in a range from about 630° C. to about 725° C.

In a second aspect of the third example glass composition, a liquidus temperature of the third example glass composition is less than or equal to about 1050° C. The second aspect of the third example glass composition may be implemented in combination with the first aspect of the third example glass composition, though the example embodiments are not limited in this respect.

In a third aspect of the third example glass composition, a working point of the third example glass composition is about $10^4$ Poise in a temperature range from about 900° C. to about 1100° C. The third aspect of the third example glass composition may be implemented in combination with the first and/or second aspect of the third example glass composition, though the example embodiments are not limited in this respect.

In a fourth aspect of the third example glass composition, a CTE of the third example glass composition is in a range from about $92\times10^{-7}$/° C. to about $100\times10^{-7}$/° C. The fourth aspect of the third example glass composition may be implemented in combination with the first, second, and/or third aspect of the third example glass composition, though the example embodiments are not limited in this respect.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A glass composition, comprising, in mol %:

| | |
|---|---|
| 58-90 | $SiO_2$ |
| 0-2.5 | $Al_2O_3$ |
| 4-10 | $B_2O_3$ |
| 3-25 | $Li_2O_3$ |
| 2-25 | $Na_2O$ |
| 0-25 | $K_2O$ |
| 0-5 | MgO |
| 0-7 | CaO |
| 0-5 | SrO |
| 0-5 | BaO |
| 0-5 | ZnO |
| 0.65-12 | $X_2O_3$, wherein the $X_2O_3$ is the sum of $Ce_2O_3$, $Pr_2O_3$, $Eu_2O_3$, $Tb_2O_3$, $Dy_2O_3$, $Ho_2O_3$, $Er_2O_3$, $Tm_2O_3$, and $Yb_2O_3$ in the glass composition and $Nd_2O_3$ is 0 mol%; |
| 10-30 | $R_2O$, wherein the $R_2O$ is the sum of $Li_2O$, $Na_2O$, $K_2O$, and $Cs_2O$ in the glass composition; and |
| 0-7 | RO, wherein the RO is the sum of MgO, CaO, SrO, BaO, and ZnO in the the glass composition. |

2. The glass composition of claim 1, comprising, in mol %:

62-90 $SiO_2$;

from 0 to less than 0.1 of one or more of the following: PbO, CdO, or $TeO_2$; and a colorant selected from the group consisting of $Cr_2O_3$, $Fe_2O_3$, CoO, NiO, and combinations thereof;

wherein a mole percent of the colorant is 50% or less of a mole percent of the $X_2O_3$.

3. The glass composition of claim 1, wherein a liquidus temperature of the glass composition is less than or equal to 1050° C.

4. The glass composition of claim 1, wherein a softening point of the glass composition is in a range from 630° C. to 725° C.

5. The glass composition according to claim 1, wherein a working point of the glass composition is about $10^4$ Poise in a temperature range from 900° C. to 1100° C.

6. The glass composition according to claim 1, wherein a CTE of the glass composition is in a range from $92\times10^{-7}$/° C. to $100\times10^{-7}$/° C.

7. The glass composition according to claim 1, wherein a ratio of a mole percent of $R_2O$ to a mole percent of RO is in a range from 1.5 to 150.

8. The glass composition according to claim 1, wherein a metamerism index of the glass composition is greater than 1 between a reference illuminant that is one of D-65, F-02, or A-10 and a test illuminant that is one of D-65, F-02, or A-10, where the reference illuminant and the test illuminant are different.

9. An article comprising the glass composition according to claim 1 combined with at least one other glass composition that has a softening point of less than 800° C.

10. The glass composition comprising, in mol %:

| | |
|---|---|
| 60-74 | $SiO_2$ |
| 0-7 | $Al_2O_3$ |
| 4-10 | $B_2O_3$ |
| 3-25 | $Li_2O_3$ |
| 2-25 | $Na_2O$ |
| 0-25 | $K_2O$ |
| 0-7 | MgO |
| 0.75-7 | CaO |
| 0-7 | SrO |
| 0-7 | BaO |
| 0-7 | ZnO |
| 0.5-12 | $X_2O_3$,wherein the $X_2O_3$ is the sum of $Ce_2O_3$, $Pr_2O_3$, $Pm_2O_3$, $Sm_2O_3$, $Eu_2O_3$, $Tb_2O_3$, $Dy_2O_3$, $Ho_2O_3$, $Er_2O_3$, and $Tm_2O_3$ in the glass composition and $Nd_2O_3$ is 0 mol%; |

-continued

| | |
|---|---|
| 10-30 | $R_2O$, wherein the $R_2O$ is the sum of $Li_2O$, $Na_2O$, $K_2O$, $Rb_2O$ and $Cs_2O$ the glass composition; |
| 0.75-7 | RO, wherein the RO is the sum of MgO, CaO, SrO, BaO,and ZnO in the glass composition; and wherein a difference between the mol% of the $R_2O$ and the mol% of the RO is greater than the mol% of the $X_2O_3$. |

11. The glass composition of claim 10, wherein a softening point of the glass composition is in a range from 630° C. to 725° C.

12. The glass composition of claim 10, wherein a liquidus temperature of the glass composition is less than or equal to 1050° C.

13. The glass composition of claim 10, wherein a working point of the glass composition is about $10^4$ Poise in a temperature range from 900° C. to 1100° C.

14. The glass composition according to claim 10, wherein a CTE of the glass composition is in a range from $92\times10^{-7}$/° C. to $100\times10^{-7}$/° C.

15. A glass composition, comprising, in mol %:

| | |
|---|---|
| 58-90 | $SiO_2$ |
| 0-5.5 | $Al_2O_3$ |
| 4-10 | $B_2O_3$ |
| 3-25 | $Li_2O_3$ |
| 2-25 | $Na_2O$ |
| 0-25 | $K_2O$ |
| 0-5 | MgO |
| 0-7 | CaO |
| 0-5 | SrO |
| 0-5 | BaO |
| 0-5 | ZnO |
| 0.6-7 | $X_2O_3$, wherein the $X_2O_3$ is the sum of $Ce_2O_3$, $Pr_2O_3$, $Nd_2O_3$, $Eu_2O_3$, $Tb_2O_3$, $Dy_2O_3$, $Ho_2O_3$, $Er_2O_3$, $Tm_2O_3$, and $Yb_2O_3$ in the glass composition; |
| 10-30 | $R_2O$, wherein the $R_2O$ is the sum of $Li_2O$, $Na_2O$, $K_2O$, and $Cs_2O$ in the glass composition; |
| 0-7 | RO, wherein the RO is the sum of MgO, CaO, SrO, BaO, and ZnO in the glass composition; from 0 to less than 0.1 of one or more of the following: PbO, CdO, or $TeO_2$; and one or more colorants, wherein the one or more colorants include one or more of the following: $Cr_2O_3$, $Fe_2O_3$, CoO, or NiO, and wherein a mole percent of the one or more colorants is 50% or less of a mole percent of the $X_2O_3$. |

16. The glass composition of claim 15, wherein a softening point of the glass composition is in a range from 630° C. to 725° C.

17. The glass composition of claim 15, wherein a liquidus temperature of the glass composition is less than or equal to 1050° C.

18. The glass composition of claim 15, wherein a working point of the glass composition is about $10^4$ Poise in a temperature range from 900° C. to 1100° C.

19. The glass composition of claim 15, wherein a CTE of the glass composition is in a range from $92\times10^{-7}$/° C. to $100\times10^{-7}$/° C.

* * * * *